(12) United States Patent
Harleman

(10) Patent No.: US 11,608,855 B2
(45) Date of Patent: Mar. 21, 2023

(54) TOOLING AND METHODS FOR CLOCKING DUAL ECCENTRIC BUSHINGS OF A CLEVIS

(71) Applicant: The Boeing Company, Chicago, IL (US)

(72) Inventor: Thomas J. Harleman, Male Valley, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/513,465

(22) Filed: Oct. 28, 2021

(65) Prior Publication Data

US 2022/0333643 A1 Oct. 20, 2022

Related U.S. Application Data

(60) Provisional application No. 63/176,055, filed on Apr. 16, 2021.

(51) Int. Cl.
*F16C 23/10* (2006.01)
*F16C 11/10* (2006.01)
(Continued)

(52) U.S. Cl.
CPC .......... *F16C 23/10* (2013.01); *F16C 11/0695* (2013.01); *F16C 11/10* (2013.01); *F16C 33/04* (2013.01); *Y10T 403/32221* (2015.01)

(58) Field of Classification Search
CPC .................. F16C 11/06; F16C 11/0614; F16C 11/0695; F16C 11/10; F16C 11/106; F16C 23/045;
(Continued)

(56) References Cited

U.S. PATENT DOCUMENTS

| 1,242,744 A | 10/1917 | Trautman |
| 3,880,444 A * | 4/1975 | Bridges .................. B62D 17/00 |
| | | 280/86.753 |

(Continued)

FOREIGN PATENT DOCUMENTS

| CN | 101074701 | 11/2007 | |
| FR | 2865512 A1 * | 7/2005 | ............. B64D 27/12 |
| FR | 3060679 | 6/2018 | |

OTHER PUBLICATIONS

Rama Kishan, Design and Analysis of Lug Joint in an Airframe Structure Using Finite Element Method, IRJET, Aug. 2017, pp. 2282-2287, vol. 4, Issue 8.
(Continued)

*Primary Examiner* — Phillip A Johnson
(74) *Attorney, Agent, or Firm* — Kunzler Bean & Adamson

(57) ABSTRACT

Tooling for clocking dual eccentric bushings of a clevis so that the clevis and a lug can be pinned together, comprises a pin and a sleeve. The pin comprises a pin cylindrical portion, a plate-engagement portion, and a stop surface. The sleeve comprises a sleeve cylindrical outer surface and a sleeve interior channel that has an interior-channel central axis, which is parallel to and offset from a sleeve-cylindrical-outer-surface central axis. The pin cylindrical portion is configured to be received by the sleeve interior channel with a slip fit. The tooling further comprises a squaring plate that comprises a squaring-plate abutment surface, configured to contact the stop surface, and a squaring-plate opening configured to receive the plate-engagement portion of the pin with a slip fit.

20 Claims, 22 Drawing Sheets

(51) Int. Cl.
*F16C 33/04* (2006.01)
*F16C 11/06* (2006.01)

(58) Field of Classification Search
CPC ... F16C 23/10; F16C 33/04; Y10T 403/32221
See application file for complete search history.

(56) References Cited

U.S. PATENT DOCUMENTS

| | | | | |
|---|---|---|---|---|
| 4,736,964 | A * | 4/1988 | Specktor | B60G 7/02 |
| | | | | 280/86.753 |
| 4,813,163 | A * | 3/1989 | Livingston | E02F 3/3604 |
| | | | | 37/444 |
| 5,809,610 | A * | 9/1998 | Eustache | B60S 1/3493 |
| | | | | 15/250.31 |
| 5,865,070 | A * | 2/1999 | Bornhorst | F16C 7/06 |
| | | | | 74/595 |
| 2003/0111576 | A1* | 6/2003 | Reniau | F16C 23/045 |
| | | | | 244/102 R |
| 2004/0165939 | A1* | 8/2004 | Marche | F16C 11/06 |
| | | | | 403/52 |
| 2006/0133890 | A1* | 6/2006 | Etoile | F16C 23/10 |
| | | | | 403/122 |
| 2013/0149023 | A1* | 6/2013 | Wiecko | F16C 11/0695 |
| | | | | 403/79 |

OTHER PUBLICATIONS

European Search Report for EU Patent Application No. 22163258.1 dated Sep. 19, 2022.

* cited by examiner

TOOLING AND METHODS FOR CLOCKING DUAL ECCENTRIC BUSHINGS OF A CLEVIS

TECHNICAL FIELD

Described herein are tooling and methods for clocking dual eccentric bushings of a clevis so that the clevis and a lug can be pinned together.

BACKGROUND

Lug-clevis couplings are commonly employed for interconnecting various objects. A lug-clevis coupling includes a lug, a clevis, and a pin. The pin is inserted through openings, formed in the lug and the legs of the clevis, to couple the lug and the clevis together. During assembly, it may be difficult to align the centerlines of the opening in the lug with the openings in the legs of the clevis. Accordingly, dual eccentric bushings are often provided in the clevis-legs openings, since it is possible to compensate for the aforementioned misalignment by clocking the eccentric bushings relative to the clevis. However, conventional techniques for clocking dual eccentric bushings are labor-intensive and time-consuming.

SUMMARY

Accordingly, apparatuses and methods, intended to address at least the above-identified concerns, would find utility.

The following is a non-exhaustive list of examples of the subject matter, disclosed herein.

Disclosed herein is tooling for clocking dual eccentric bushings of a clevis so that the clevis and a lug can be pinned together. The tooling comprises a pin that comprises a pin central axis, a pin cylindrical portion, a plate-engagement portion, extending along the pin central axis from the pin cylindrical portion, and a stop surface, located between the pin cylindrical portion and the plate-engagement portion and extending perpendicular to the pin central axis. The tooling also comprises a sleeve that comprises a sleeve cylindrical outer surface that has a sleeve-cylindrical-outer-surface diameter and a sleeve-cylindrical-outer-surface central axis. The sleeve additionally comprises a sleeve interior channel that is cylindrical, that has a sleeve-interior-channel diameter, and that has an interior-channel central axis, which is parallel to the sleeve-cylindrical-outer-surface central axis and is offset from the sleeve-cylindrical-outer-surface central axis by a sleeve-minimum-offset distance. The pin cylindrical portion is configured to be received by the sleeve interior channel with a slip fit. The tooling further comprises a squaring plate, which comprises a squaring-plate abutment surface that is configured to contact the stop surface of the pin. The squaring plate also comprises a squaring-plate opening that extends through the squaring-plate abutment surface and is configured to receive the plate-engagement portion of the pin with a slip fit.

The tooling promotes the clocking of dual eccentric bushings of the clevis in an efficient manner. Clocking of the dual eccentric bushings of the clevis enables the clevis and the lug to be pinned together. When the squaring-plate opening receives the plate-engagement portion of the pin with the slip fit and the squaring-plate abutment surface is flat against the clevis, the squaring plate enables the pin central axis to be square with the clevis. The stop surface of the pin keeps the pin from passing through the squaring-plate opening when the squaring-plate abutment surface contacts the stop surface of the pin. When the sleeve interior channel receives the pin cylindrical portion with the slip fit, the sleeve promotes a determination of the angular orientations of the dual eccentric bushings relative to the clevis that clock the dual eccentric bushings of the clevis. Accordingly, the pin, the sleeve, and the squaring plate of the tooling cooperate to facilitate clocking of the dual eccentric bushings of the clevis so that the clevis and the lug can be pinned together.

Also disclosed herein is a first method of using the tooling for clocking the dual eccentric bushings of the clevis so that the clevis and the lug, which comprises a through opening and a spherical bearing, located in the through opening, can be pinned together. The first method comprises a step of, with the lug positioned between a first leg and a second leg of the clevis such that the pin cylindrical portion is capable of simultaneously extending through a first-leg opening in the first leg of the clevis, through the spherical bearing in the through opening of the lug, and through a second-leg opening of the second leg of the clevis, inserting the pin, in a first translational direction relative to the clevis, through the second-leg opening, through the spherical bearing in the through opening of the lug, and through the first-leg opening. The spherical bearing is configured to receive the pin cylindrical portion with a slip fit. The first method additionally comprises a step of, with the plate-engagement portion of the pin received within the squaring-plate opening with a slip fit, and with a portion of the squaring-plate abutment surface contacting the stop surface of the pin, abutting the squaring-plate abutment surface against a second-leg abutment surface of the second leg of the clevis so that the pin central axis is parallel to or collinear with a first-leg-opening central axis of the first-leg opening and is parallel to or collinear with a second-leg-opening central axis of the second-leg opening, and so that the pin cylindrical portion extends through the second-leg opening, through the spherical bearing in the through opening of the lug, and through the first-leg opening. The first method also comprises a step of biasing a first outer eccentric bushing in a second translational direction relative to the clevis, opposite the first translational direction, until the pin cylindrical portion is received into a first-outer-eccentric-bushing opening of the first outer eccentric bushing, and a first-outer-eccentric-bushing exterior cylindrical surface of the first outer eccentric bushing is received with a slip fit into the first-leg opening. The first-outer-eccentric-bushing exterior cylindrical surface has a first-outer-eccentric-bushing-exterior-cylindrical-surface central axis, the first-outer-eccentric-bushing opening has a first-outer-eccentric-bushing-opening central axis that is offset from and is parallel to the first-outer-eccentric-bushing-exterior-cylindrical-surface central axis, and the sleeve cylindrical outer surface is configured to be received within the first-outer-eccentric-bushing opening with a slip fit. The first method further comprises a step of, with the pin cylindrical portion extending through the first-outer-eccentric-bushing opening, biasing the sleeve in the second translational direction relative to the clevis while rotating at least one of the sleeve or the first outer eccentric bushing relative to the clevis until the pin cylindrical portion is received within the sleeve interior channel with the slip fit, a portion of the sleeve cylindrical outer surface is received with a slip fit within the first-outer-eccentric-bushing opening, the first outer eccentric bushing is in a first angular orientation relative to the clevis, and the sleeve is in a second angular orientation relative to the clevis. The first method also comprises a step of removing the sleeve from the first-outer-eccentric-bushing opening in the second translational direction relative to the clevis, while maintaining the first outer eccentric bushing in the first angular orientation relative to the clevis. The first method additionally comprises a step of, while maintaining the first outer eccentric bushing in the first angular orientation relative to the clevis, biasing a first inner eccentric bushing, which comprises a first-inner-eccentric-bushing exterior cylindrical surface that has a diameter, identical to the sleeve-cylindrical-outer-surface diameter, and that also has a first-inner-eccentric-bushing-exterior-cylindrical-surface central axis, and which first inner eccentric bushing further comprises a first-inner-eccentric-bushing opening that is cylindrical, that has a diameter, identical to the sleeve-interior-channel diameter, and that has a first-inner-eccentric-bushing-opening central axis, which is parallel to the first-inner-eccentric-bushing-exterior-cylindrical-surface central axis and is offset from the first-inner-eccentric-bushing-exterior-cylindrical-surface central axis by a distance, equal to the sleeve-minimum-offset distance, in the second translational direction relative to the clevis, with the first inner eccentric bushing in the second angular orientation relative to the clevis, until at least a portion of the first-inner-eccentric-bushing exterior cylindrical surface is received with a slip fit within the first-outer-eccentric-bushing opening. The first method additionally comprises a step of, while maintaining the first outer eccentric bushing in the first angular orientation relative to the clevis and the first inner eccentric bushing in the second angular orientation relative to the clevis, removing the pin, in the second translational direction relative to the clevis, from the sleeve interior channel, from the spherical bearing in the through opening of the lug, and from the second-leg opening before the step of removing the sleeve from the first-outer-eccentric-bushing opening, or removing the pin, in the second translational direction relative to the clevis, from the first-outer-eccentric-bushing opening, from the spherical bearing in the through opening of the lug, and from the second-leg opening after the step of removing the sleeve from the first-outer-eccentric-bushing opening and before biasing the first inner eccentric bushing in the second translational direction relative to the clevis until at least the portion of the first-inner-eccentric-bushing exterior cylindrical surface is received with the slip fit within the first-outer-eccentric-bushing opening, or removing the pin, in the second translational direction relative to the clevis, from the first-inner-eccentric-bushing opening, from the spherical bearing in the through opening of the lug, and from the second-leg opening after the step of removing the sleeve from the first-outer-eccentric-bushing opening and after biasing the first inner eccentric bushing, in the second translational direction relative to the clevis, until at least the portion of the first-inner-eccentric-bushing exterior cylindrical surface is received with the slip fit within the first-outer-eccentric-bushing opening. The first method additionally comprises a step of, with the first outer eccentric bushing in the first angular orientation relative to the clevis and the first inner eccentric bushing in the second angular orientation relative to the clevis, inserting the pin, in the second translational direction relative to the clevis, through the first-inner-eccentric-bushing opening with the slip fit, through the spherical bearing in the through opening of the lug with the slip fit, and through the second-leg opening. The first method further comprises a step of biasing a second outer eccentric bushing in the first translational direction relative to the clevis until the pin cylindrical portion is received into a second-outer-eccentric-bushing opening of the second outer eccentric bushing, and a second-outer-eccentric-bushing exterior cylindrical surface of the second outer eccentric bushing is received with a slip fit within the second-leg opening. The second-outer-eccentric-bushing exterior cylindrical surface comprises a second-outer-eccentric-bushing-exterior-cylindrical-surface central axis, and the second-outer-eccentric-bushing opening has a second-outer-eccentric-bushing-opening central axis that is offset from and is parallel to the second-outer-eccentric-bushing-exterior-cylindrical-surface central axis, and the sleeve cylindrical outer surface is configured to be received within the second-outer-eccentric-bushing opening with a slip fit. The first method also comprises a step of, with the pin cylindrical portion extending through the second-outer-eccentric-bushing opening, biasing the sleeve in the first translational direction relative to the clevis while rotating at least one of the sleeve or the second outer eccentric bushing relative to the clevis until the pin cylindrical portion is received within the sleeve interior channel with the slip fit, a portion of the sleeve cylindrical outer surface is received with a slip fit within the second-outer-eccentric-bushing opening, the second outer eccentric bushing is in a third angular orientation relative to the clevis, and the sleeve is in a fourth angular orientation relative to the clevis. The first method additionally comprises a step of removing the sleeve from the second-outer-eccentric-bushing opening in the second translational direction relative to the clevis, while maintaining the second outer eccentric bushing in the third angular orientation relative to the clevis. The first method further comprises a step of, while maintaining the second outer eccentric bushing in the third angular orientation relative to the clevis, biasing a second inner eccentric bushing, which comprises a second-inner-eccentric-bushing exterior cylindrical surface that has a diameter, identical to the sleeve-cylindrical-outer-surface diameter, and that also has a second-inner-eccentric-bushing-exterior-cylindrical-surface central axis, and which second inner eccentric bushing also comprises a second-inner-eccentric-bushing opening that is cylindrical, that has a diameter, identical to the sleeve-interior-channel diameter, and that has a second-inner-eccentric-bushing-opening central axis, which is parallel to the second-inner-eccentric-bushing-exterior-cylindrical-surface central axis and is offset from the second-inner-eccentric-bushing-exterior-cylindrical-surface central axis by a distance, equal to the sleeve-minimum-offset distance, in the first translational direction relative to the clevis, with the second inner eccentric bushing in the fourth angular orientation relative to the clevis, until at least a portion of the second-inner-eccentric-bushing exterior cylindrical surface of the second inner eccentric bushing is received with a slip fit within the second-outer-eccentric-bushing opening. The first method also comprises a step of, while maintaining the first outer eccentric bushing in the first angular orientation relative to the clevis, the first inner eccentric bushing in the second angular orientation relative to the clevis, the second outer eccentric bushing in the third angular orientation relative to the clevis, and the second inner eccentric bushing in the fourth angular orientation relative to the clevis, removing the pin, in the first translational direction relative to the clevis, from the sleeve interior channel, from the spherical bearing in the through opening of the lug, and from the first-inner-eccentric-bushing opening before removing the sleeve from the second-outer-eccentric-bushing opening, or removing the pin, in the first translational direction relative to the clevis, from the second-outer-eccentric-bushing opening, from the spherical bearing in the through opening of the lug, and from the first-inner-eccentric-bushing opening after the step of removing the sleeve from the second-outer-eccentric-bushing opening and before the step of biasing the second inner eccentric bushing in the first translational direction relative to the clevis until at least the portion of the second-inner-eccentric-bushing exterior cylindrical surface is received with the slip fit within the second-outer-eccentric-bushing opening, or removing the pin, in the first translational direction relative to the clevis, from the second-inner-eccentric-bushing opening, from the spherical bearing in the through opening of the lug, and from the first-inner-eccentric-bushing opening after the step of removing the sleeve from the second-outer-eccentric-bushing opening and after the step of biasing the second inner eccentric bushing in the first translational direction relative to the clevis until at least the portion of the second-inner-eccentric-bushing exterior cylindrical surface is received with the slip fit within the second-outer-eccentric-bushing opening.

The first method promotes the clocking of dual eccentric bushings of the clevis in an efficient manner. Clocking of the dual eccentric bushings of the clevis enables the clevis and the lug to be pinned together. Dual eccentric bushings and the spherical bearing help to accommodate pinning together the clevis and the lug when the clevis and the lug are misaligned. Abutting the squaring-plate abutment surface against the second-leg abutment surface, when the plate-engagement portion of the pin is received within the squaring-plate opening with the slip fit, enables the pin central axis to be square with the clevis. The stop surface of the pin keeps the pin from passing through the squaring-plate opening when the squaring-plate abutment surface contacts the stop surface of the pin. The pin cylindrical portion mimics the locking pin that is used to pin together the clevis and the lug. Biasing the sleeve in the second translational direction while rotating at least one of the sleeve or the first outer eccentric bushing relative to the clevis until the pin cylindrical portion is received within the sleeve interior channel with the slip fit, and the portion of sleeve cylindrical outer surface is received with the slip fit within the first-outer-eccentric-bushing opening facilitates the first outer eccentric bushing being in a proper position and angular orientation for clocking the first outer eccentric bushing with the first inner eccentric bushing. The sleeve, having the sleeve-cylindrical-outer-surface diameter identical to the diameter of the first-inner-eccentric-bushing exterior cylindrical surface, the sleeve-interior-channel diameter identical to the diameter of the first-inner-eccentric-bushing opening, and the sleeve-minimum-offset distance equal to a distance between the first-inner-eccentric-bushing-exterior-cylindrical-surface central axis and is offset from the first-inner-eccentric-bushing-exterior-cylindrical-surface central axis enables the sleeve to replicate the first inner eccentric bushing and provides a proper angular orientation for the first inner eccentric bushing to clock with the first outer eccentric bushing. Biasing the sleeve in the first translational direction while rotating at least one of the sleeve or the second outer eccentric bushing relative to the clevis until the pin cylindrical portion is received within the sleeve interior channel with the slip fit, and the portion of sleeve cylindrical outer surface is received with the slip fit within the second-outer-eccentric-bushing opening facilitates the second outer eccentric bushing being in a proper position and angular orientation for clocking the second outer eccentric bushing with the second inner eccentric bushing. The sleeve, having the sleeve-cylindrical-outer-surface diameter identical to the diameter of the second-inner-eccentric-bushing exterior cylindrical surface, the sleeve-interior-channel diameter identical to the diameter of second-inner-eccentric-bushing opening, and the sleeve-minimum-offset distance equal to a distance between the second-inner-eccentric-bushing-exterior-cylindrical-surface central axis and is offset from the second-inner-eccentric-bushing-exterior-cylindrical-surface central axis enables the sleeve to replicate the second inner eccentric bushing and provides a proper angular orientation for the second inner eccentric bushing to clock with the second outer eccentric bushing. Accordingly, the first method facilitates clocking of two pair of dual eccentric bushings of the clevis so that the clevis and the lug can be pinned together.

Additionally disclosed herein is a second method of using the tooling for clocking the dual eccentric bushings of the clevis so that the clevis and the lug, which comprises a through opening and a spherical bearing, located in the through opening, can be pinned together. The second method comprises a step of, with the lug positioned between a first leg and a second leg of the clevis such that the pin cylindrical portion is capable of simultaneously extending through a first-leg opening in the first leg of the clevis, through the spherical bearing in the through opening of the lug, and through a second-leg opening of the second leg of the clevis, inserting the pin, in a first translational direction relative to the clevis, through the second-leg opening, through the spherical bearing in the through opening of the lug, and through the first-leg opening. The spherical bearing is configured to receive the pin cylindrical portion with a slip fit. The second method additionally comprises a step of, with the plate-engagement portion of the pin received within the squaring-plate opening with a slip fit, and with a portion of the squaring-plate abutment surface contacting the stop surface of the pin, abutting the squaring-plate abutment surface against a second-leg abutment surface of the second leg of the clevis so that the pin central axis is parallel to or collinear with a first-leg-opening central axis of the first-leg opening and is parallel to or collinear with a second-leg-opening central axis of the second-leg opening, and so that the pin cylindrical portion extends through the second-leg opening, through the spherical bearing in the through opening of the lug, and through the first-leg opening. The second method also comprises a step of biasing a first outer eccentric bushing in a second translational direction relative to the clevis, opposite the first translational direction, until the pin cylindrical portion is received into a first-outer-eccentric-bushing opening of the first outer eccentric bushing, and a first-outer-eccentric-bushing exterior cylindrical surface of the first outer eccentric bushing is received with a slip fit into the first-leg opening. The first-outer-eccentric-bushing exterior cylindrical surface has an outer bushing diameter and a first-outer-eccentric-bushing-exterior-cylindrical-surface central axis. The first-outer-eccentric-bushing opening has a first-outer-eccentric-bushing-opening central axis that is offset from, by an outer bearing offset distance, and is parallel to the first-outer-eccentric-bushing-exterior-cylindrical-surface central axis. The sleeve cylindrical outer surface is configured to be received within the first-outer-eccentric-bushing opening with a slip fit. The second method also comprises a step of, with the pin cylindrical portion extending through the first-outer-eccentric-bushing opening, biasing the sleeve in the second translational direction relative to the clevis while rotating at least one of the sleeve or the first outer eccentric bushing relative to the clevis until the pin cylindrical portion is received within the sleeve interior channel with the slip fit, a portion of the sleeve cylindrical outer surface is received with a slip fit within the first-outer-eccentric-bushing opening, the first outer eccentric bushing is in a first angular orientation relative to the clevis, and the sleeve is in a second angular orientation relative to the clevis. The second method additionally comprises a step of removing the sleeve, in the second translational direction relative to the clevis, from the first-outer-eccentric-bushing opening while maintaining the first outer eccentric bushing in the first angular orientation relative to the clevis. The second method further comprises a step of, while maintaining the first outer eccentric bushing in the first angular orientation relative to the clevis, biasing a first inner eccentric bushing, which comprises a first-inner-eccentric-bushing exterior cylindrical surface that has a diameter, identical to the sleeve-cylindrical-outer-surface diameter, and that also has a first-inner-eccentric-bushing-exterior-cylindrical-surface central axis, and which first inner eccentric bushing also comprises a first-inner-eccentric-bushing opening that is cylindrical, that has a diameter, identical to the sleeve-interior-channel diameter, and that has a first-inner-eccentric-bushing-opening central axis, which is parallel to the first-inner-eccentric-bushing-exterior-cylindrical-surface central axis and is offset from the first-inner-eccentric-bushing-exterior-cylindrical-surface central axis by a distance, equal to the sleeve-minimum-offset distance, in the second translational direction relative to the clevis toward the first outer eccentric bushing, with the first inner eccentric bushing in the second angular orientation relative to the clevis, until at least a portion of the first-inner-eccentric-bushing exterior cylindrical surface is received with a slip fit within the first-outer-eccentric-bushing opening. The second method additionally comprises a step of, while maintaining the first outer eccentric bushing in the first angular orientation relative to the clevis and the first inner eccentric bushing in the second angular orientation relative to the clevis, removing the pin, in the second translational direction relative to the clevis, from the sleeve interior channel, from the spherical bearing in the through opening of the lug, and from the second-leg opening before the step of removing the sleeve from the first-outer-eccentric-bushing opening, or removing the pin, in the second translational direction relative to the clevis, from the first-outer-eccentric-bushing opening, from the spherical bearing in the through opening of the lug, and from the second-leg opening after removing the sleeve from the first-outer-eccentric-bushing opening and before biasing the first inner eccentric bushing in the second translational direction relative to the clevis until at least the portion of the first-inner-eccentric-bushing exterior cylindrical surface is received with the slip fit within the first-outer-eccentric-bushing opening, or removing the pin, in the second translational direction relative to the clevis, from the first-inner-eccentric-bushing opening, from the spherical bearing in the through opening of the lug, and from the second-leg opening after removing the sleeve from the first-outer-eccentric-bushing opening and after biasing the first inner eccentric bushing in the second translational direction relative to the clevis until at least the portion of the first-inner-eccentric-bushing exterior cylindrical surface is received with the slip fit within the first-outer-eccentric-bushing opening. The second method also comprises a step of biasing the second outer eccentric bushing in the first translational direction relative to the clevis, with the second outer eccentric bushing in a third angular orientation relative to the clevis, wherein the third angular orientation is angularly offset from the first angular orientation by 180 degrees, until a second-outer-eccentric-bushing exterior cylindrical surface of the second outer eccentric bushing is received with a slip fit into the second-leg opening. The second-outer-eccentric-bushing exterior cylindrical surface has a diameter, identical to the outer bushing diameter, and a second-outer-eccentric-bushing-exterior-cylindrical-surface central axis. The second-outer-eccentric-bushing opening has a second-outer-eccentric-bushing-opening central axis that is offset from, by the outer bearing offset distance, and is parallel to the second-outer-eccentric-bushing-exterior-cylindrical-surface central axis. The second method also comprises a step of, while maintaining the second outer eccentric bushing in the third angular orientation relative to the clevis, biasing the second inner eccentric bushing, which comprises a second-inner-eccentric-bushing exterior cylindrical surface that has a diameter, identical to the sleeve-cylindrical-outer-surface diameter, and that also has a second-inner-eccentric-bushing-exterior-cylindrical-surface central axis, and which second inner eccentric busing also comprises a second-inner-eccentric-bushing opening that is cylindrical, that has a diameter, identical to the sleeve-interior-channel diameter, and that has a second-inner-eccentric-bushing-opening central axis, which is parallel to the second-inner-eccentric-bushing-exterior-cylindrical-surface central axis and is offset from the second-inner-eccentric-bushing-exterior-cylindrical-surface central axis by a distance, equal to the sleeve-minimum-offset distance, in the first translational direction relative to the clevis with the second inner eccentric bushing in a fourth angular orientation relative to the clevis, until at least a portion of the second-inner-eccentric-bushing exterior cylindrical surface is received with a slip fit within the second-outer-eccentric-bushing opening. The fourth angular orientation is angularly offset from the second angular orientation by 180 degrees.

The second method promotes the clocking of dual eccentric bushings of the clevis in an efficient manner. Clocking of the dual eccentric bushings of the clevis enables the clevis and the lug to be pinned together. Dual eccentric bushings and the spherical bearing help to accommodate pinning together the clevis and the lug when the clevis and the lug are misaligned. The abutting squaring-plate abutment surface against the second-leg abutment surface, when the plate-engagement portion of the pin is received within the squaring-plate opening with the slip fit, enables the pin central axis to be square with the clevis. The stop surface of the pin keeps the pin from passing through the squaring-plate opening when the squaring-plate abutment surface contacts the stop surface of the pin. The pin cylindrical portion mimics the locking pin that is used to pin together the clevis and the lug. Biasing the sleeve in the second translational direction while rotating at least one of the sleeve or the first outer eccentric bushing relative to the clevis until the pin cylindrical portion is received within the sleeve interior channel with the slip fit, and the portion of the sleeve cylindrical outer surface is received with the slip fit within the first-outer-eccentric-bushing opening facilitates the first outer eccentric bushing being in a proper position and angular orientation for clocking the first outer eccentric bushing with the first inner eccentric bushing. The sleeve, having the sleeve-cylindrical-outer-surface diameter identical to the diameter of the first-inner-eccentric-bushing exterior cylindrical surface, the sleeve-interior-channel diameter identical to the diameter of the first-inner-eccentric-bushing opening, and the sleeve-minimum-offset distance equal to a distance between the first-inner-eccentric-bushing-exterior-cylindrical-surface central axis and is offset from the first-inner-eccentric-bushing-exterior-cylindrical-surface central axis enables the sleeve to replicate the first inner eccentric bushing and provides a proper angular orientation for first the inner eccentric bushing to clock with the first outer eccentric bushing. Biasing the second outer eccentric bushing in the first translational direction, with the second outer eccentric bushing in the third angular orientation relative to the clevis, until the second-outer-eccentric-bushing exterior cylindrical surface is received with the slip fit into the second-leg opening facilitates the second outer eccentric bushing being in a proper position and angular orientation for clocking the second outer eccentric bushing with the second inner eccentric bushing. Biasing the second inner eccentric bushing in the first translational direction with the second inner eccentric bushing in the fourth angular orientation relative to the clevis, until at least the portion of second-inner-eccentric-bushing exterior cylindrical surface is received with the slip fit within the second-outer-eccentric-bushing opening facilitates the second inner eccentric bushing being in a proper position and angular orientation for clocking the second inner eccentric bushing with the second outer eccentric bushing.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1A:
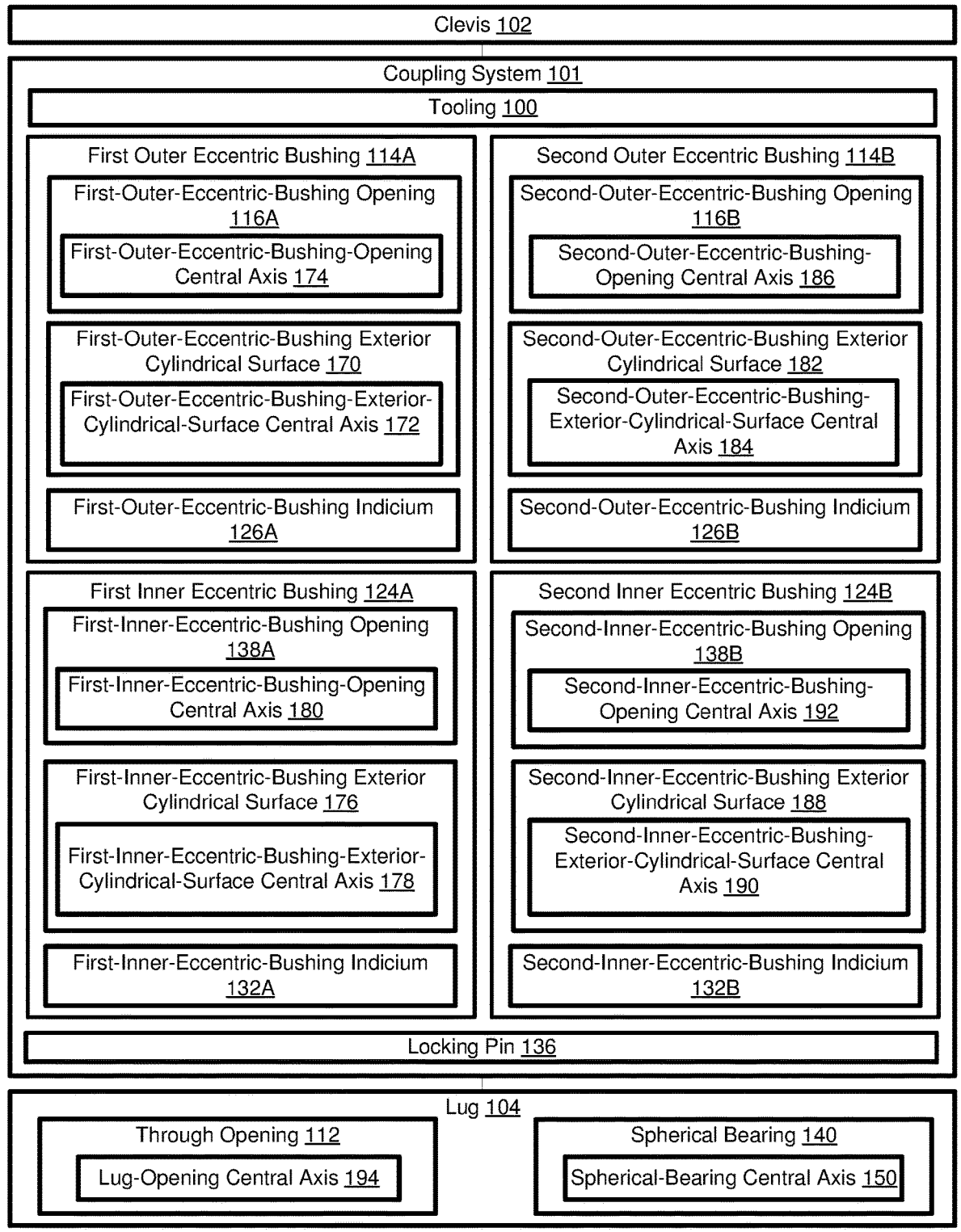
FIG. 1A is a block diagram of a clevis, a lug, and a coupling system therefor, according to one or more examples of the subject matter, disclosed herein.
Figure 1B:
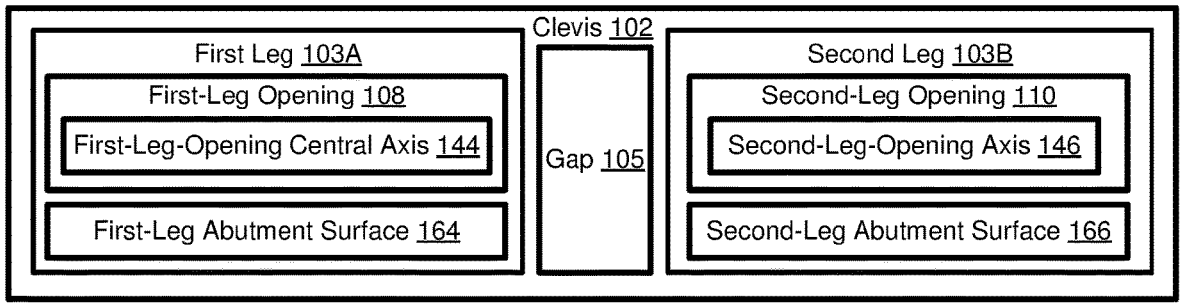
FIG. 1B is a block diagram of the clevis of FIG. 1A, according to one or more examples of the subject matter, disclosed herein.
Figure 1C:
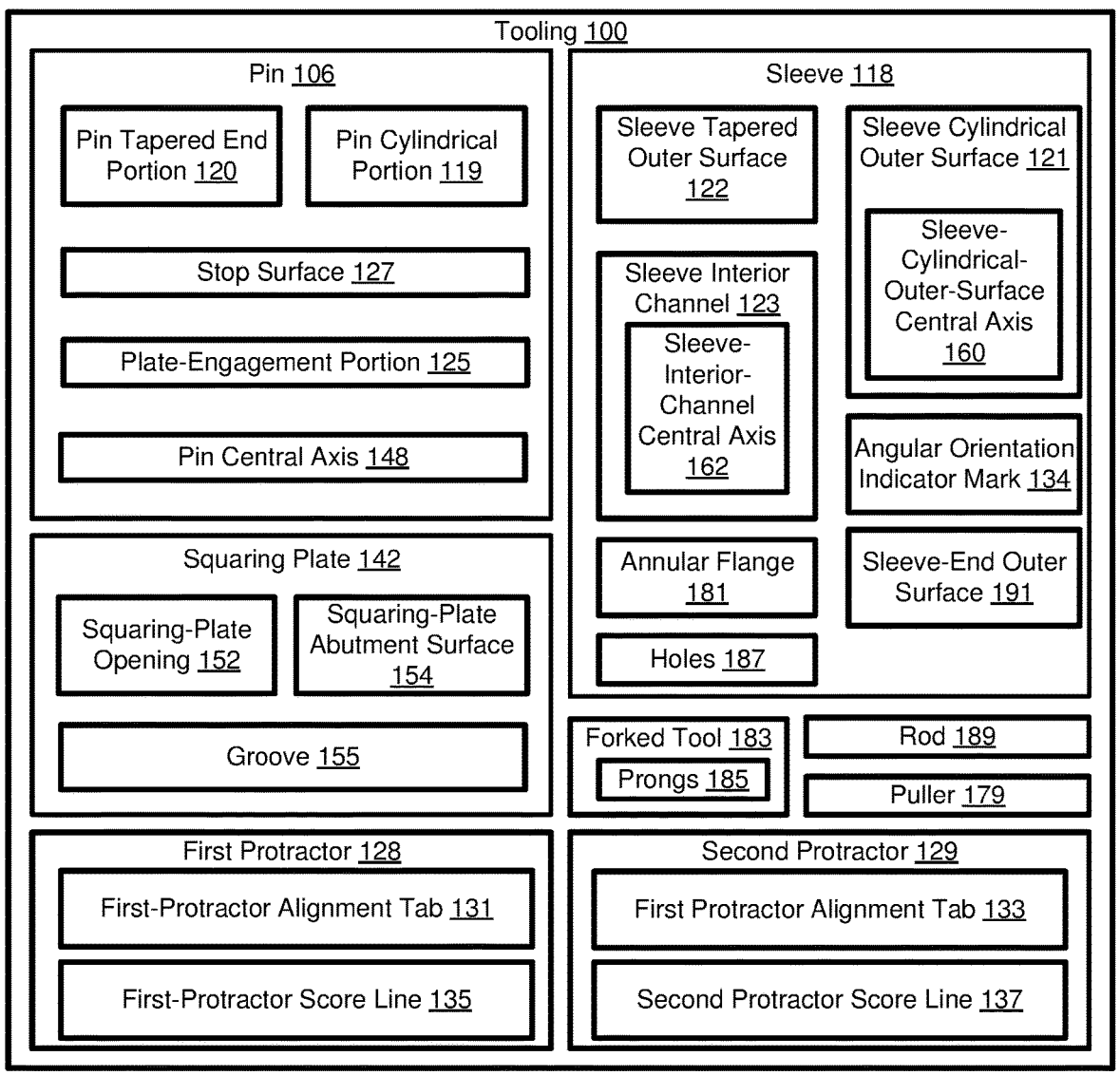
FIG. 1C is a block diagram of tooling of the coupling system of FIG. 1A, according to one or more examples of the subject matter, disclosed herein.
Figure 2:
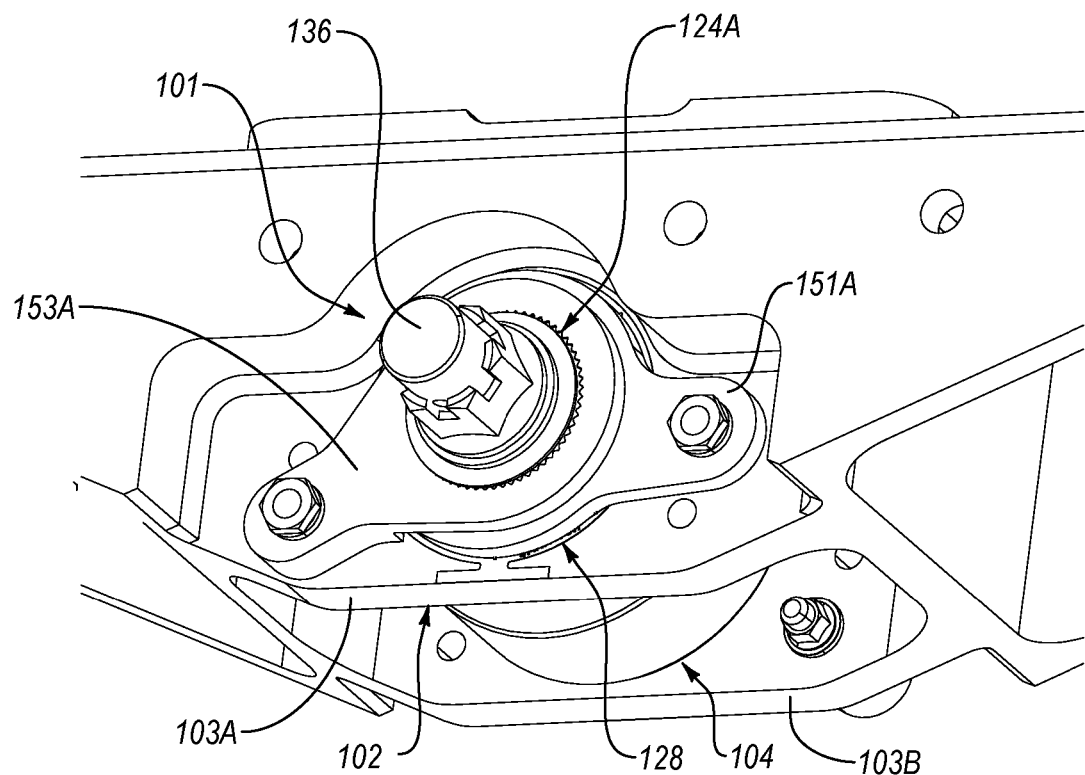
FIG. 2 is a schematic, perspective view of the clevis, the lug, and the coupling system of FIG. 1A, according to one or more examples of the subject matter, disclosed herein.
Figure 3:
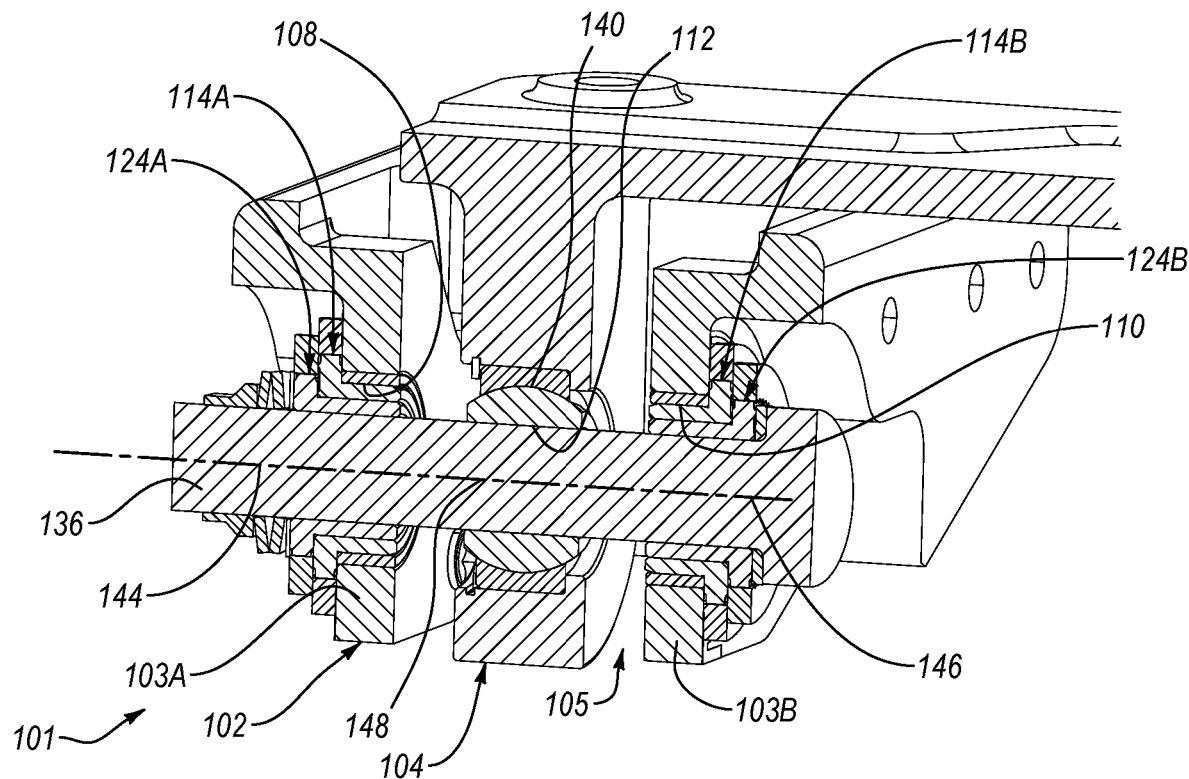
FIG. 3 is a schematic, perspective, sectional view of the clevis, the lug, and the coupling system of FIG. 1A, according to one or more examples of the subject matter, disclosed herein.

In FIGS. 1A, 1B, and 1C, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIGS. 1A, 1B, and 1C may be combined in various ways without the need to include other features described in FIGS. 1A, 1B, and 1C, other drawing figures, and/or the accompanying disclosure, even though such combination or combinations are not explicitly illustrated herein. Similarly, additional features not limited to the examples presented, may be combined with some or all of the features shown and described herein.

Figure 29:
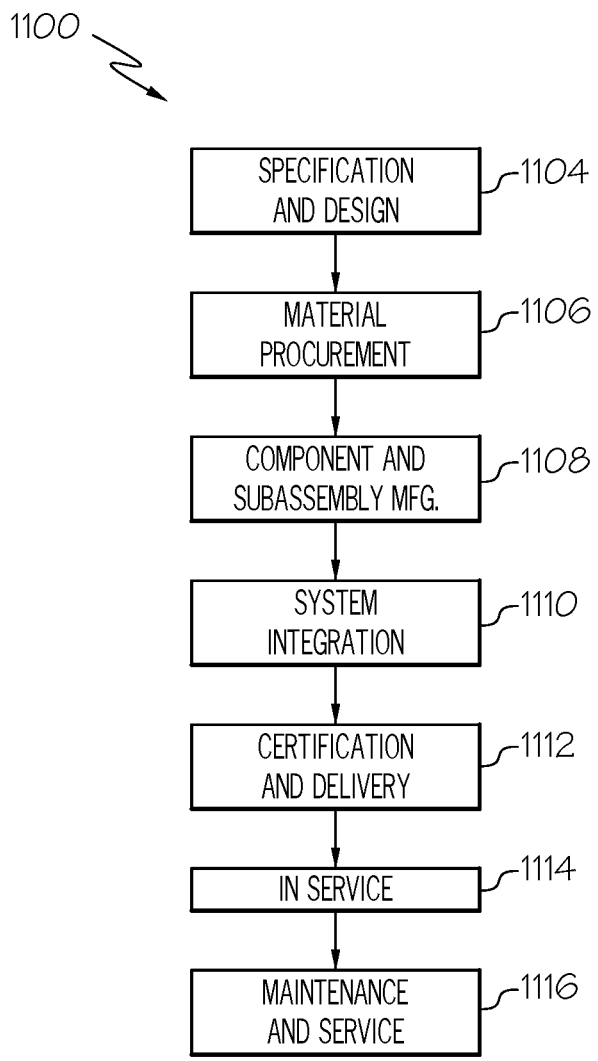
FIG. 29 is a block diagram of aircraft production and service methodology.

In FIG. 29, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 29 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIGS. 1A, 1B, and 1C and particularly to, e.g., FIGS. 4, 8A-9, 11, 16, 18, 22, and 23 for illustrative purposes only and not by way of limitation, the following portion of this paragraph delineates example 1 of the subject matter, disclosed herein. According to example 1, tooling 100 for clocking dual eccentric bushings of clevis 102 so that clevis 102 and lug 104 can be pinned together, comprises pin 106, which comprises pin central axis 148, pin cylindrical portion 119, plate-engagement portion 125, extending along pin central axis 148 from pin cylindrical portion 119, and stop surface 127, located between pin cylindrical portion 119 and plate-engagement portion 125 and extending perpendicular to pin central axis 148. Tooling 100 also comprises sleeve 118, which comprises sleeve cylindrical outer surface 121 that has sleeve-cylindrical-outer-surface diameter and sleeve-cylindrical-outer-surface central axis 160. Sleeve 118 also comprises sleeve interior channel 123 that is cylindrical, that has sleeve-interior-channel diameter, and that has interior-channel central axis 162, which is parallel to sleeve-cylindrical-outer-surface central axis 160 and is offset from sleeve-cylindrical-outer-surface central axis 160 by sleeve-minimum-offset distance. Pin cylindrical portion 119 is configured to be received by sleeve interior channel 123 with a slip fit. Tooling 100 further comprises squaring plate 142, which comprises squaring-plate abutment surface 154, configured to contact stop surface 127 of pin 106, and squaring-plate opening 152, extending through squaring-plate abutment surface 154 and configured to receive plate-engagement portion 125 of pin 106 with a slip fit.

Tooling 100 promotes the clocking of dual eccentric bushings of clevis 102 in an efficient manner. Clocking of the dual eccentric bushings of clevis 102 enables clevis 102 and lug 104 to be pinned together. When squaring-plate opening 152 receives plate-engagement portion 125 of pin 106 with the slip fit and squaring-plate abutment surface 154 is flat against clevis 102, squaring plate 142 enables pin central axis 148 to be square with clevis 102. Stop surface 127 of pin 106 keeps pin 106 from passing through squaring-plate opening 152 when squaring-plate abutment surface 154 contacts stop surface 127 of pin 106. When sleeve interior channel 123 receives pin cylindrical portion 119 with the slip fit, sleeve 118 promotes a determination of the angular orientations of the dual eccentric bushings relative to clevis 102 that clock the dual eccentric bushings of clevis 102. Accordingly, pin 106, sleeve 118, and squaring plate 142 of tooling 100 cooperate to facilitate clocking of the dual eccentric bushings of clevis 102 so that clevis 102 and lug 104 can be pinned together.

Referring generally to FIGS. 1A and 1C and particularly to, e.g., FIGS. 4, 8A-9, 11, 16, 18-20, and 22-24 for illustrative purposes only and not by way of limitation, the following portion of this paragraph delineates example 2 of the subject matter, disclosed herein. According to example 2, which encompasses example 1, above, pin 106 further comprises pin tapered end portion 120, extending along pin central axis 148 from pin cylindrical portion 119 away from plate-engagement portion 125. Pin tapered end portion 120 and plate-engagement portion 125 of pin 106 extend from pin cylindrical portion 119 in opposite directions.

Pin tapered end portion 120 facilitates the insertion of pin 106 into sleeve interior channel 123 by promoting self-centering of pin 106 relative to sleeve interior channel 123.

Referring generally to FIGS. 1A and 1C and particularly to, e.g., FIGS. 4, 6, 8A-9, 11, 22, and 23 for illustrative purposes only and not by way of limitation, the following portion of this paragraph delineates example 3 of the subject matter, disclosed herein. According to example 3, which encompasses example 1 or 2, above, sleeve 118 further comprises sleeve tapered outer surface 122, extending along sleeve-cylindrical-outer-surface central axis 160 from sleeve cylindrical outer surface 121.

Sleeve tapered outer surface 122 facilitates the insertion of sleeve 118 into an opening of an outer one of the dual eccentric bushings by promoting self-centering of sleeve 118 relative to the opening of the outer one of the dual eccentric bushings.

Referring generally to FIGS. 1A and 1C and particularly to, e.g., FIGS. 4, 8A-11, and 16-18 for illustrative purposes only and not by way of limitation, the following portion of this paragraph delineates example 4 of the subject matter, disclosed herein. According to example 4, which encompasses any one of examples 1 to 3, above, sleeve 118 further comprises sleeve-end outer surface 191, extending perpendicular to sleeve-cylindrical-outer-surface central axis 160, and angular-orientation indicator mark 134, located on at least one of sleeve cylindrical outer surface 121 or sleeve-end outer surface 191.

Angular-orientation indicator mark 134 helps to identify angular orientation of sleeve 118 relative to clevis 102.

Referring generally to FIGS. 1A and 1C and particularly to, e.g., FIGS. 8A-12, 14-25, and 27 for illustrative purposes only and not by way of limitation, the following portion of this paragraph delineates example 5 of the subject matter, disclosed herein. According to example 5, which encompasses example 4, above, tooling 100 further comprises first protractor 128 and second protractor 129. Each one of first protractor 128 and second protractor 129 is configured to identify an angular orientation of angular-orientation indicator mark 134 of sleeve 118.

First protractor 128, when circumferentially surrounding sleeve 118, promotes an identification of an angular orientation of sleeve 118 relative to clevis 102 on one side of clevis 102 and thus an identification of the angular orientations of a first set of dual eccentric bushings relative to clevis 102 that clock the first set of dual eccentric bushings of clevis 102 on one side of clevis 102. Second protractor 129, when circumferentially surrounding sleeve 118, promote an identification of the angular orientations of a second set of dual eccentric bushings relative to clevis 102 that clock the second set of dual eccentric bushings of clevis 102 on an opposite side of clevis 102.

Figure 4:
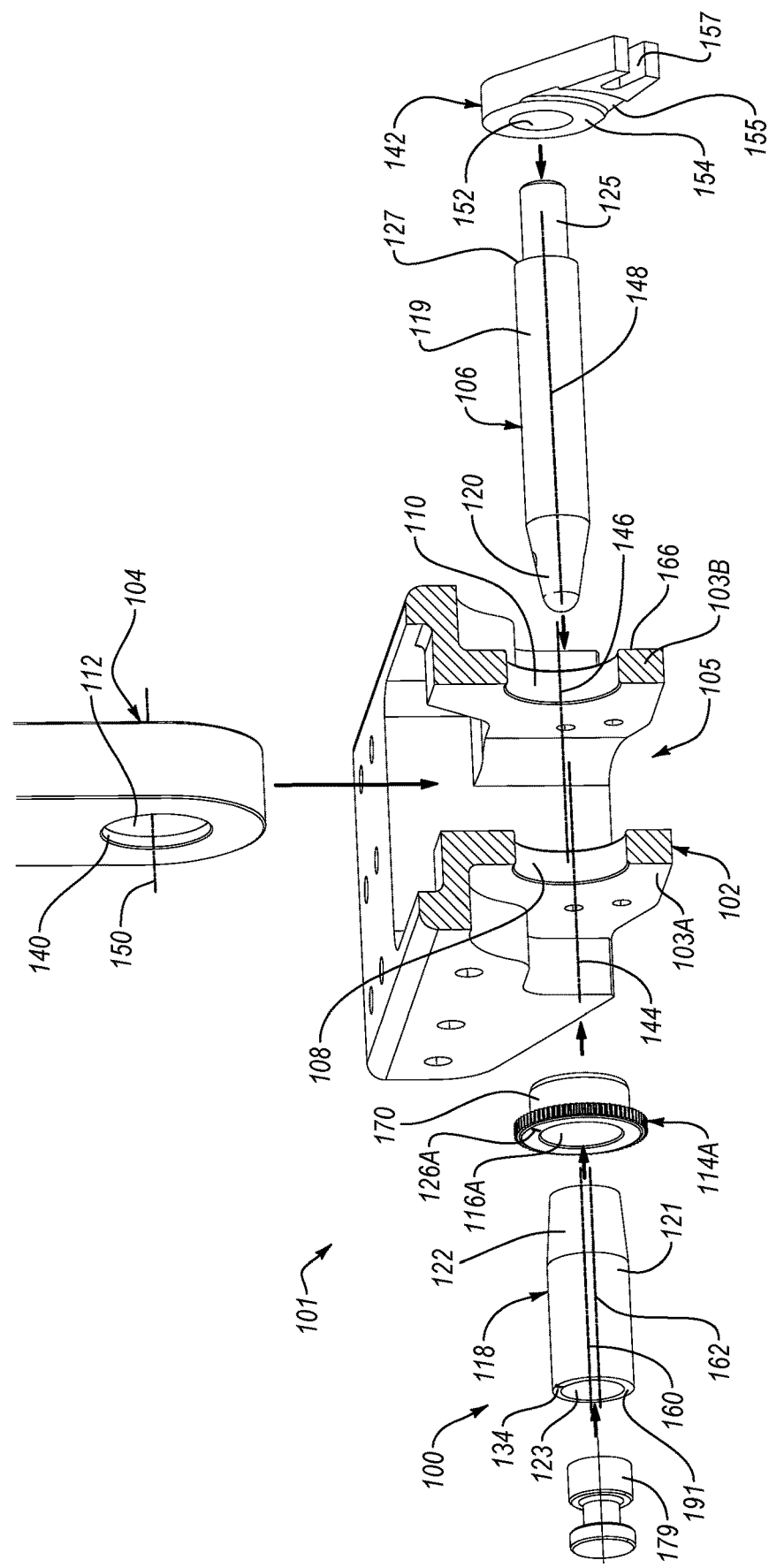
FIG. 4 is a schematic, perspective, exploded view of the clevis, the lug, and the coupling system of FIG. 1A, according to one or more examples of the subject matter, disclosed herein.
Figure 5A:
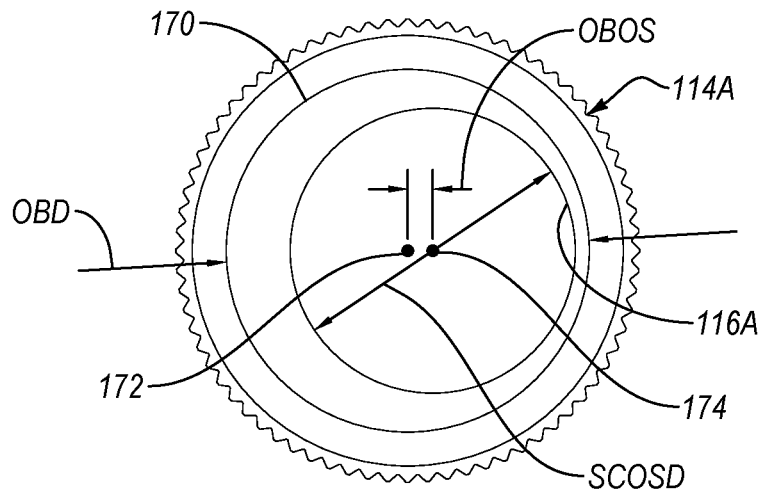
FIG. 5A is a schematic, elevation view of a first outer eccentric bushing of the coupling system of FIG. 1A, according to one or more examples of the subject matter, disclosed herein.
Figure 5B:
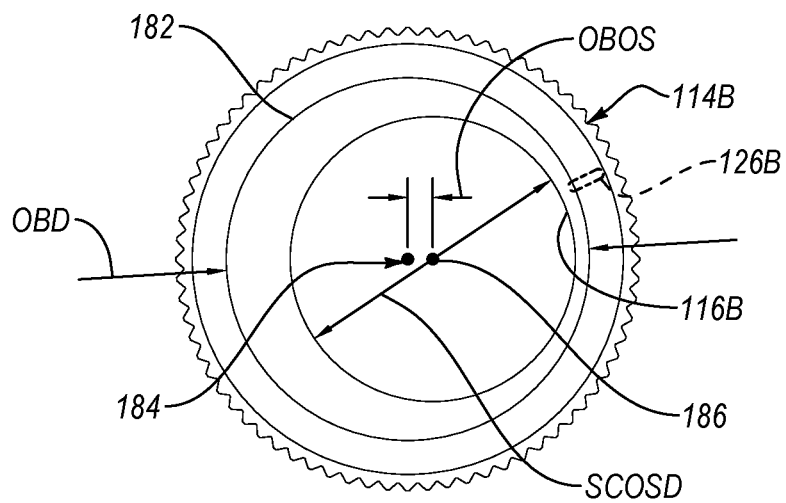
FIG. 5B is a schematic, elevation view of a second outer eccentric bushing of the coupling system of FIG. 1A, according to one or more examples of the subject matter, disclosed herein.
Figure 6:
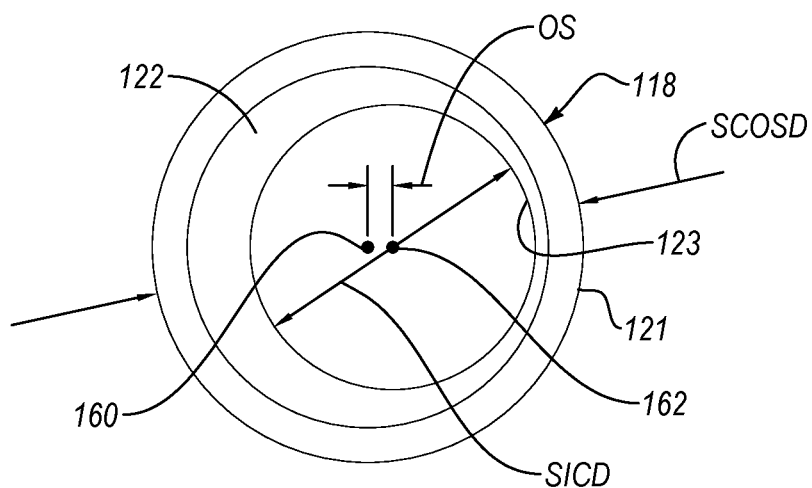
FIG. 6 is a schematic, elevation view of a sleeve of tooling of the coupling system of FIG. 1A, according to one or more examples of the subject matter, disclosed herein.
Figure 7A:
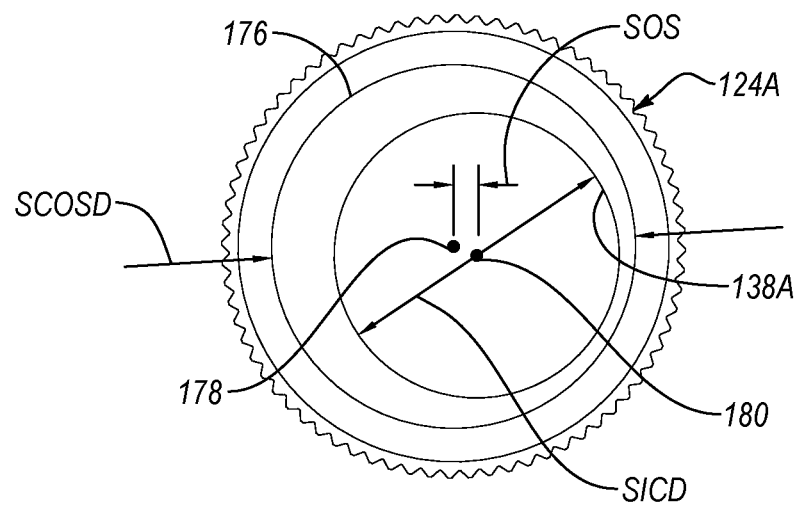
FIG. 7A is a schematic, elevation view of a first inner eccentric bushing of the coupling system of FIG. 1A, according to one or more examples of the subject matter, disclosed herein.
Figure 7B:
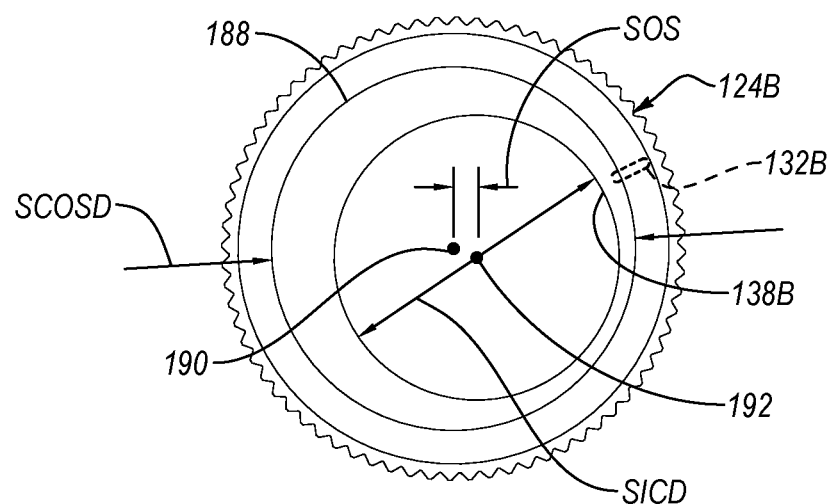
FIG. 7B is a schematic, elevation view of a second inner eccentric bushing of the coupling system of FIG. 1A, according to one or more examples of the subject matter, disclosed herein.
Figure 13:
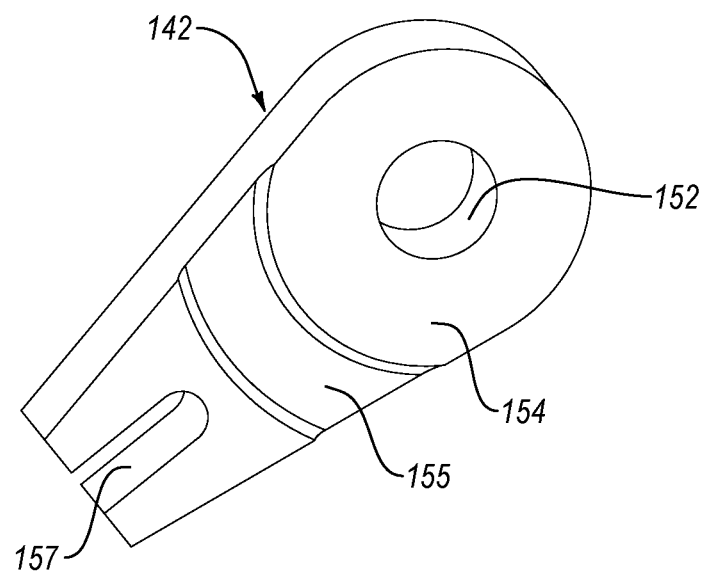
FIG. 13 is a schematic, perspective view of a squaring plate of tooling of the coupling system of FIG. 1A, according to one or more examples of the subject matter, disclosed herein.

Referring generally to FIGS. 1A and 1C and particularly to, e.g., FIGS. 4 and 13 for illustrative purposes only and not by way of limitation, the following portion of this paragraph delineates example 6 of the subject matter, disclosed herein. According to example 6, which encompasses example 5, above, first protractor 128 has a maximum thickness, and second protractor 129 has the maximum thickness. Squaring plate 142 further comprises groove 155, formed in squaring-plate abutment surface 154. Groove 155 is shaped to receive either one of first protractor 128 or second protractor 129. Groove 155 has a depth that is greater than the maximum thickness of first protractor 128 and of second protractor 129.

Groove 155 of squaring plate 142, being configured to receive second protractor 129, enables squaring-plate abutment surface 154 to squarely contact a surface of clevis 102 when second protractor 129 is attached to the surface of clevis 102 by receiving second protractor 129 within groove 155. In other words, because second protractor 129 is received within groove 155, second protractor 129 does not obstruct squaring-plate abutment surface 154 from squarely contacting the surface of clevis 102 to which second protractor 129 is attached.

Referring generally to FIGS. 1A and 1C and particularly to, e.g., FIGS. for illustrative purposes only and not by way of limitation, the following portion of this paragraph delineates example 7 of the subject matter, disclosed herein. According to example 7, which encompasses example 5 or 6, above, each one of first protractor 128 and second protractor 129 is an adhesive sticker.

The adhesive sticker of each one of first protractor 128 and second protractor 129 enables first protractor 128 and second protractor 129 to be removably adhered to clevis 102 and enables first protractor 128 and second protractor 129 to be temporarily attached to clevis 102 for purposes of clocking the dual eccentric bushings and, if desired, removed from clevis 102 after clocking the dual eccentric bushings.

Referring generally to FIGS. 1A and 1C and particularly to, e.g., FIGS. 8A-12, 14-25, and 27 for illustrative purposes only and not by way of limitation, the following portion of this paragraph delineates example 8 of the subject matter, disclosed herein. According to example 8, which encompasses example 7, above, first protractor 128 comprises first-protractor alignment tab 131 that defines first-protractor-clevis-alignment edge 139. Second protractor 129 comprises second-protractor alignment tab 133 that defines second-protractor-clevis-alignment edge 141.

First-protractor alignment tab 131 enables accurate placement of first protractor 128 on clevis 102. Second-protractor alignment tab 133 enables accurate placement of second protractor 129 on clevis 102.

Referring generally to FIGS. FIGS. 1A and 1C and particularly to, e.g., FIGS. 8A-12, 14-25, and 27 for illustrative purposes only and not by way of limitation, the following portion of this paragraph delineates example 9 of the subject matter, disclosed herein. According to example 9, which encompasses example 8, above, first protractor 128 further comprises first-protractor score line 135 between squaring-plate opening 152 and first-protractor alignment tab 131. Second protractor 129 further comprises second-protractor score line 137 between squaring-plate opening 152 and second-protractor alignment tab 133.

First-protractor score line 135 promotes removal of first-protractor alignment tab 131 from first protractor 128 along first-protractor score line 135. Second-protractor score line 137 promotes removal of second-protractor alignment tab 133 from second protractor 129 along second-protractor score line 137.

Figure 12:
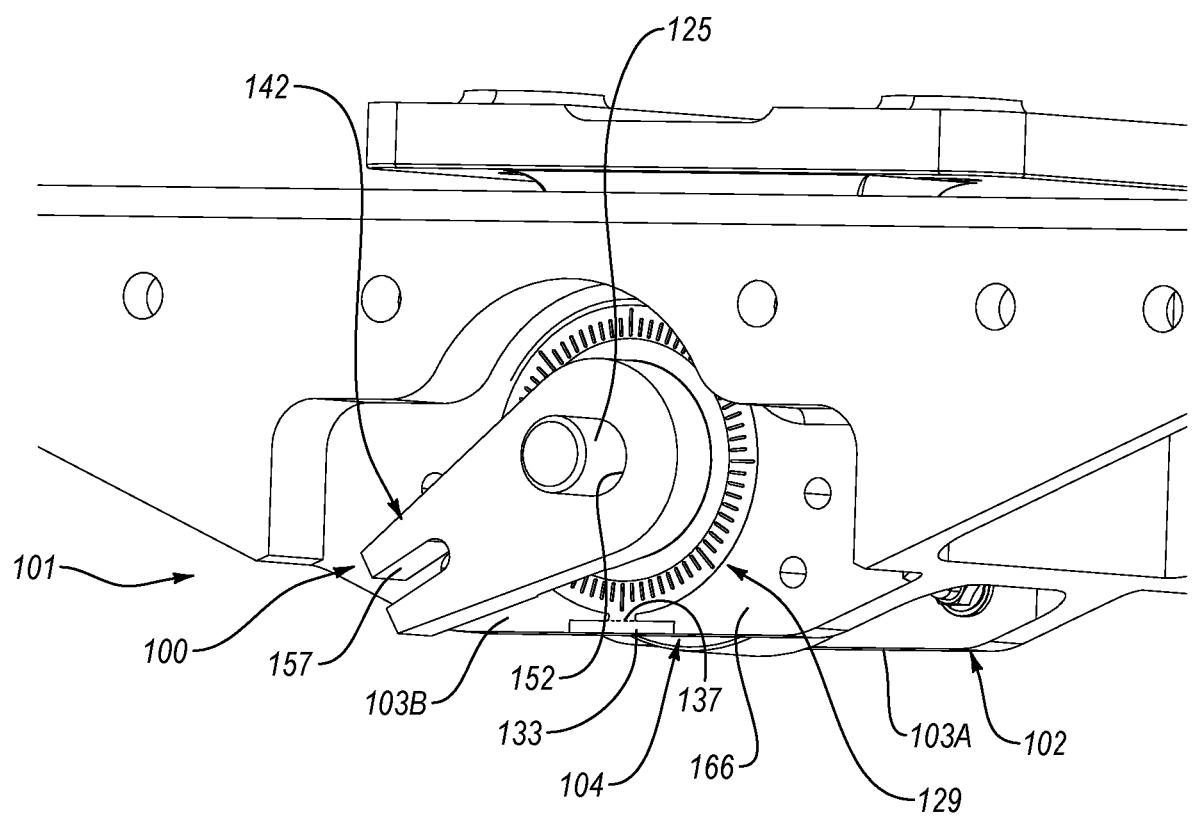
FIG. 12 is a schematic, perspective view of the clevis, the lug, and the coupling system of FIG. 1A, according to one or more examples of the subject matter, disclosed herein.

Referring generally to FIGS. 1A and 1C and particularly to, e.g., FIGS. 4, 12, and 13 for illustrative purposes only and not by way of limitation, the following portion of this paragraph delineates example 10 of the subject matter, disclosed herein. According to example 10, which encompasses any one of examples 1 to 9, above, squaring plate 142 further comprises notch 157 that is offset from squaring-plate opening 152 in a direction, perpendicular to a central axis of squaring-plate opening 152. Notch 157 of squaring plate 142 is closed in directions, perpendicular to the radius of squaring-plate opening 152, and along a plane, perpendicular to the central axis of squaring-plate opening 152.

Notch 157 of squaring plate 142, is configured to help keep squaring-plate abutment surface 154 in squaring contact with clevis 102 when notch 157 is engaged with clevis 102 and enables pin 106 to remain square to clevis 102 as the dual eccentric bushings of clevis 102 are clocked.

Referring generally to FIGS. 1A and 1C and particularly to, e.g., FIGS. 4, 9, 10, and 11 for illustrative purposes only and not by way of limitation, the following portion of this paragraph delineates example 11 of the subject matter, disclosed herein. According to example 11, which encompasses any one of examples 1 to 10, above, tooling 100 further comprises puller 179 that is configured to threadably engage sleeve 118.

Puller 179, when threadably engaged with sleeve 118, promotes pulling sleeve 118 relative to clevis 102.

Figure 16:
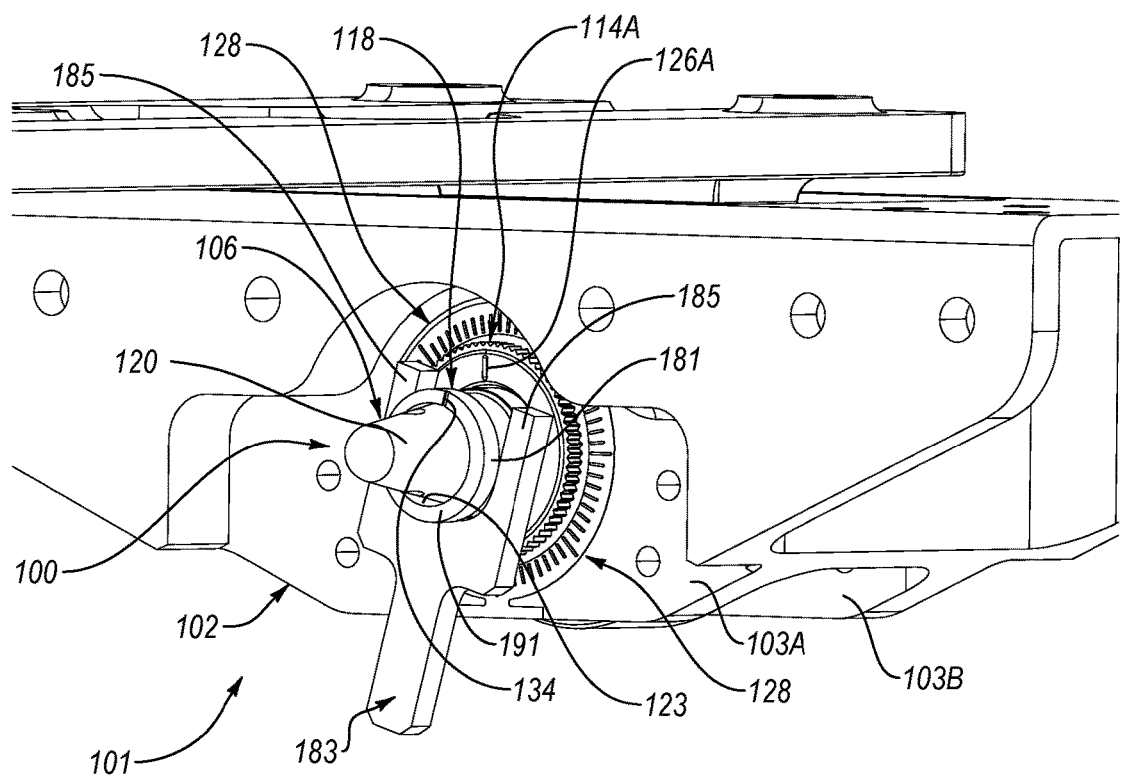
FIG. 16 is a schematic, perspective view of the clevis, the lug, and the coupling system of FIG. 1A, according to one or more examples of the subject matter, disclosed herein.

Referring generally to FIGS. 1A and 1C and particularly to, e.g., FIG. 16 for illustrative purposes only and not by way of limitation, the following portion of this paragraph delineates example 12 of the subject matter, disclosed herein. According to example 12, which encompasses any one of examples 1 to 11, above, sleeve 118 further comprises annular flange 181, extending circumferentially about and protruding radially outwardly from sleeve cylindrical outer surface 121.

Annular flange 181 helps to prevent sleeve 118 from being inserted to far into clevis 102.

Referring generally to FIGS. 1A and 1C and particularly to, e.g., FIG. 16 for illustrative purposes only and not by way of limitation, the following portion of this paragraph delineates example 13 of the subject matter, disclosed herein. According to example 13, which encompasses example 12, above, tooling 100 further comprises forked tool 183, comprising prongs 185. Prongs 185 are spaced-apart so that sleeve cylindrical outer surface 121 fits between prongs 185, and annular flange 181 has a diameter, which is greater than a distance between prongs 185.

Forked tool 183 promotes pulling sleeve 118 relative to clevis 102. In some examples, forked tool 183 also facilitates rotating sleeve 118 relative to clevis 102.

Figure 17:
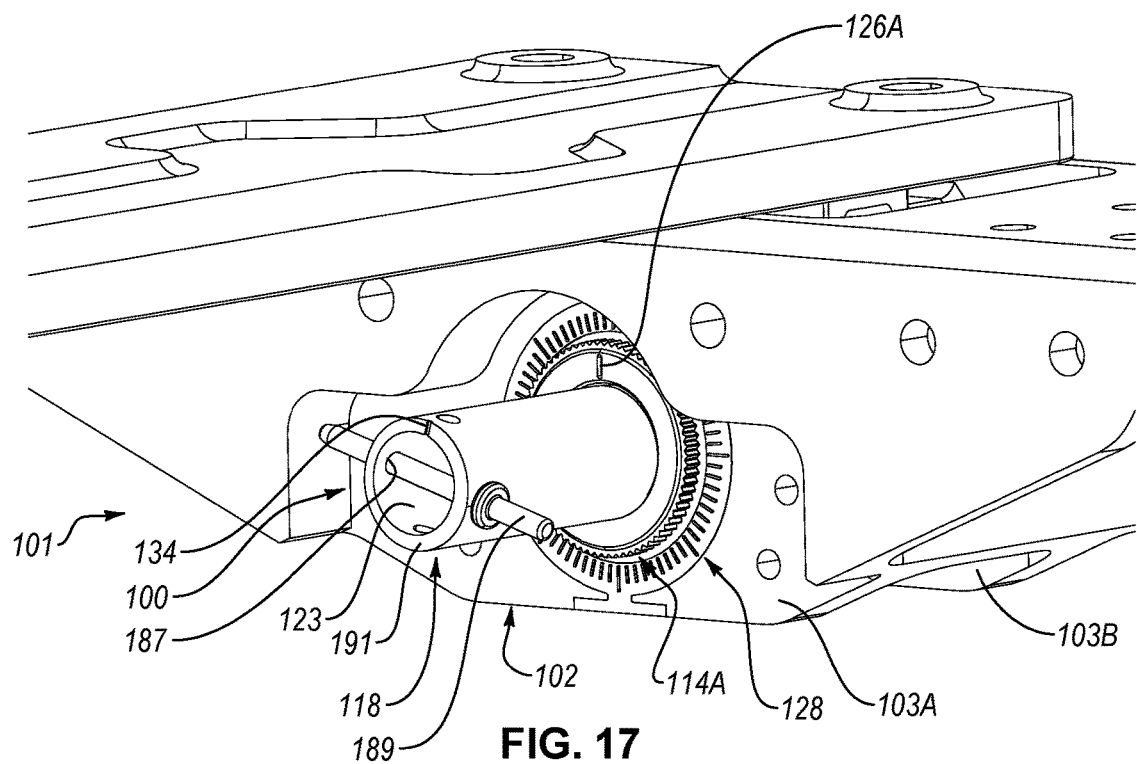
FIG. 17 is a schematic, perspective view of the clevis, the lug, and the coupling system of FIG. 1A, according to one or more examples of the subject matter, disclosed herein.
Figure 18:
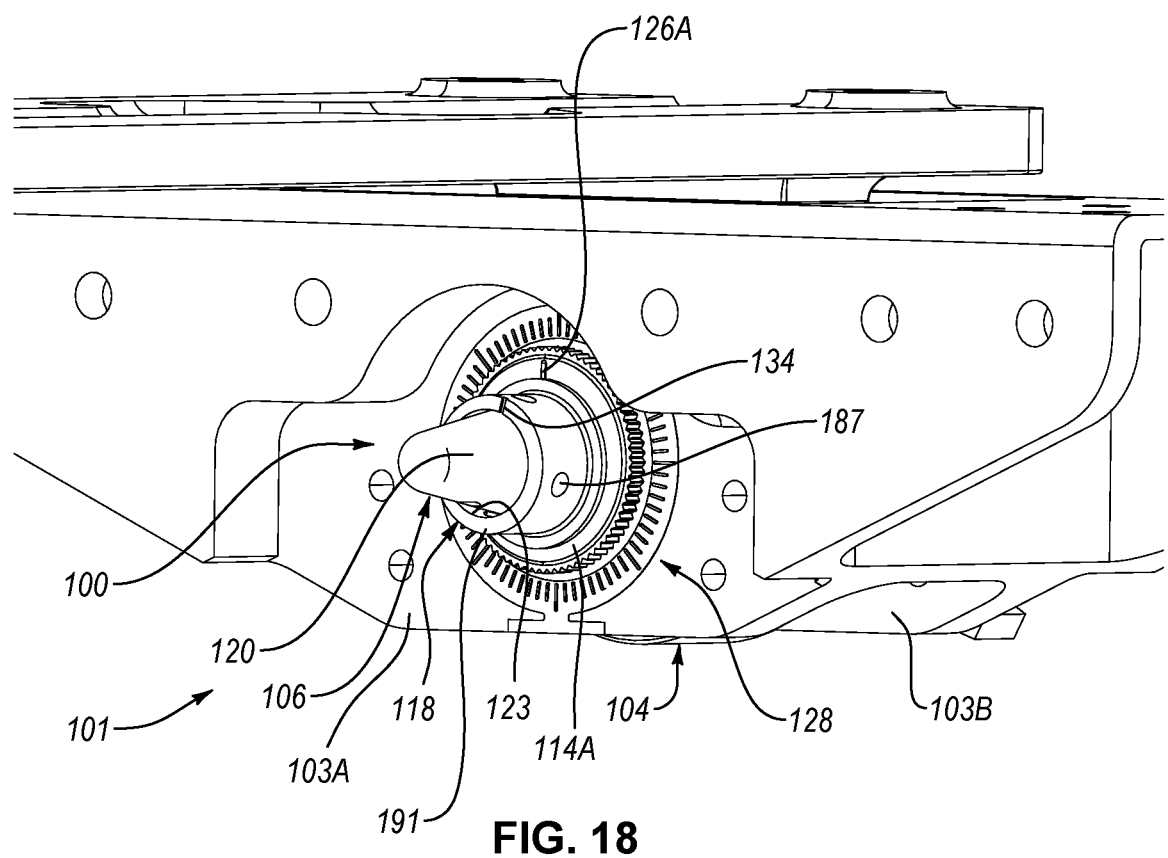
FIG. 18 is a schematic, perspective view of the clevis, the lug, and the coupling system of FIG. 1A, according to one or more examples of the subject matter, disclosed herein.
Figure 19:
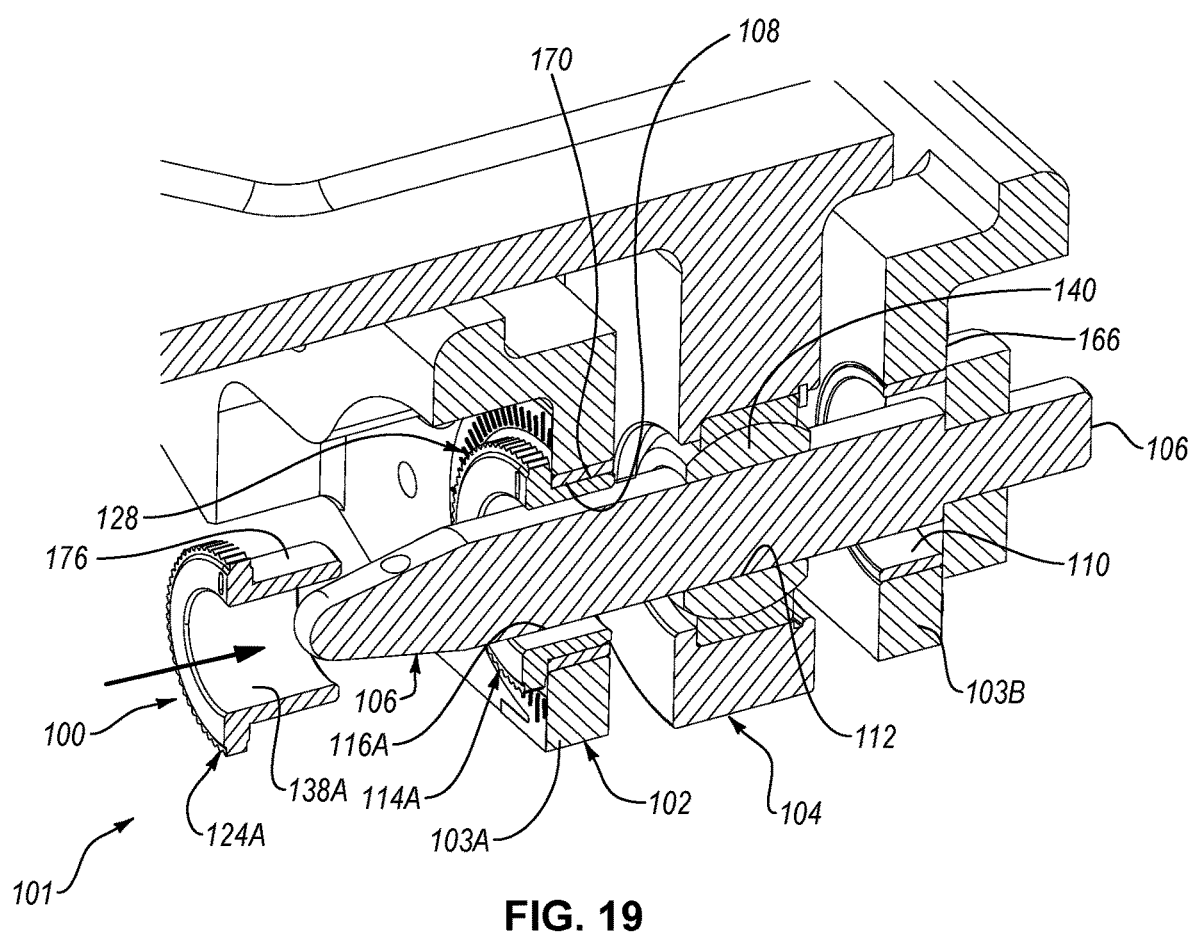
FIG. 19 is a schematic, perspective, sectional view of the clevis, the lug, and the coupling system of FIG. 1A, according to one or more examples of the subject matter, disclosed herein.
Figure 20:
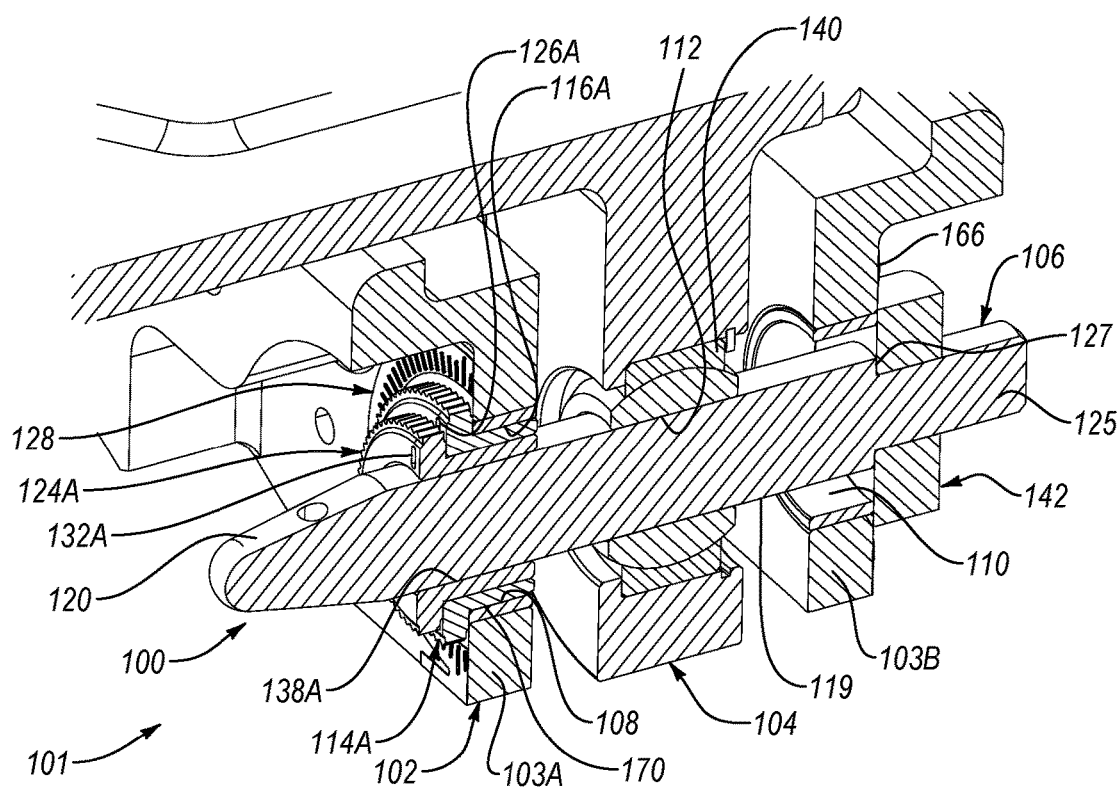
FIG. 20 is a schematic, perspective, sectional view of the clevis, the lug, and the coupling system of FIG. 1A, according to one or more examples of the subject matter, disclosed herein.
Figure 21:
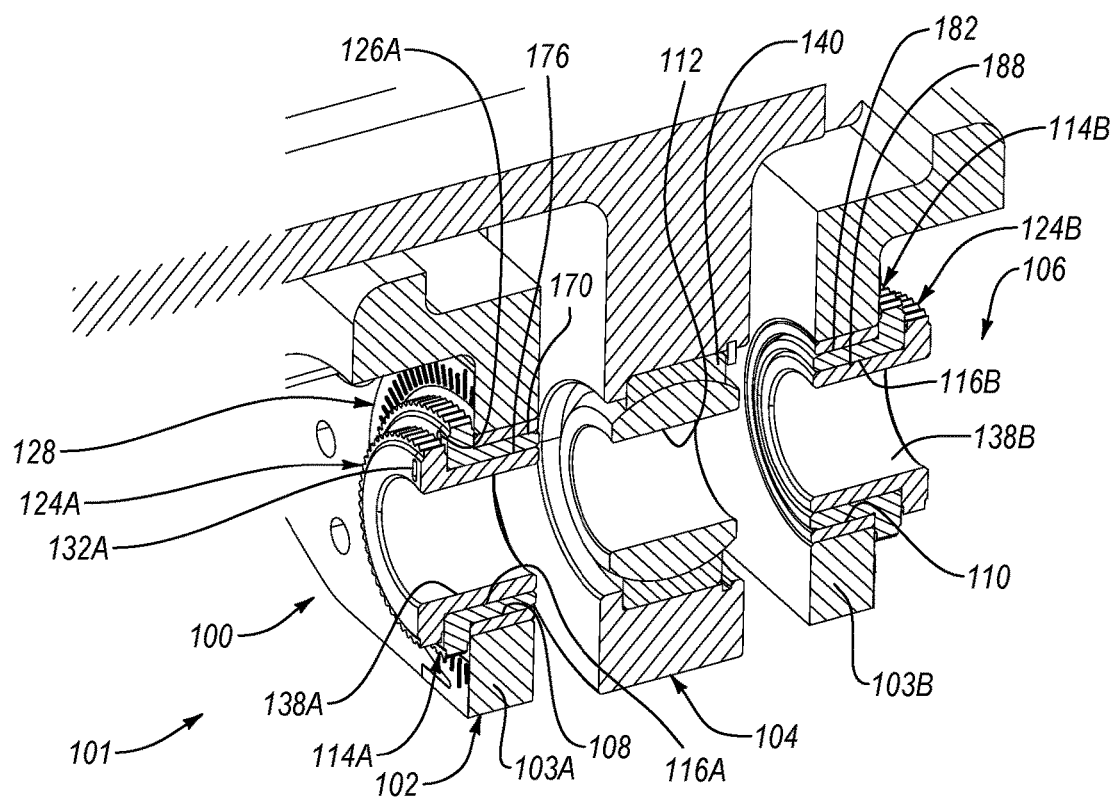
FIG. 21 is a schematic, perspective, sectional view of the clevis, the lug, and the coupling system of FIG. 1A, according to one or more examples of the subject matter, disclosed herein.
Figure 22:
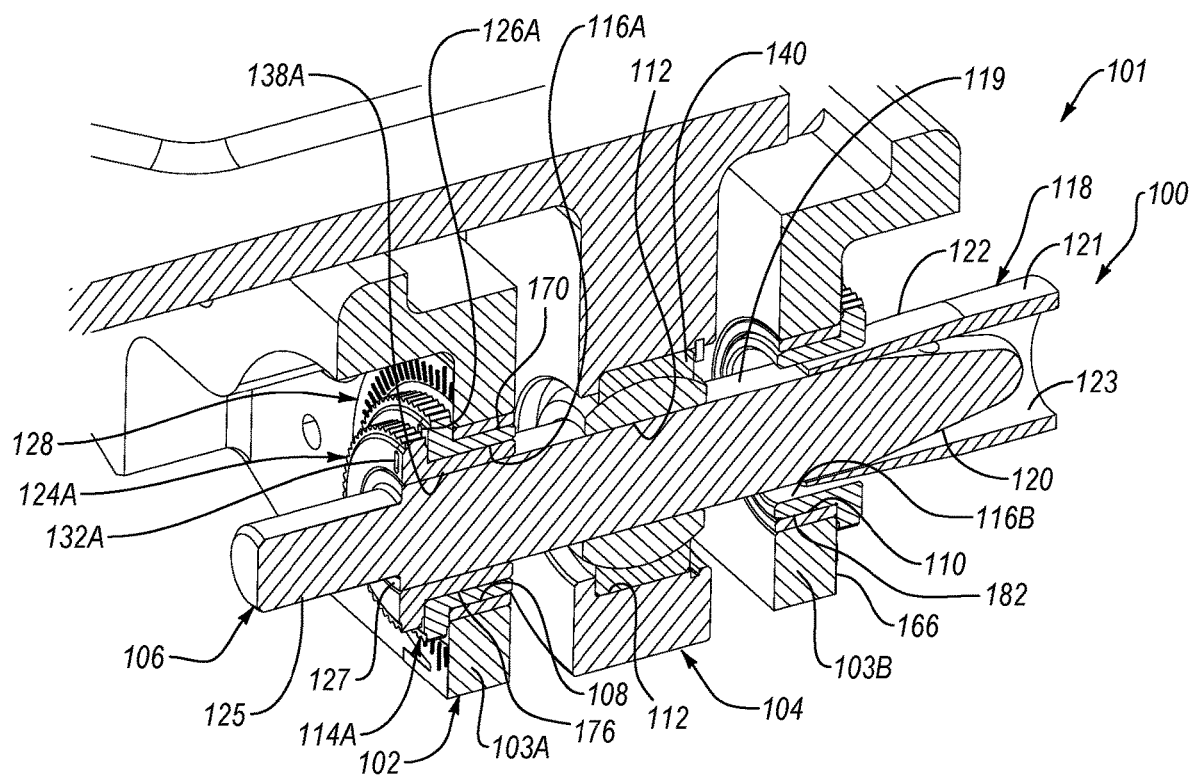
FIG. 22 is a schematic, perspective, sectional view of the clevis, the lug, and the coupling system of FIG. 1A, according to one or more examples of the subject matter, disclosed herein.
Figure 23:
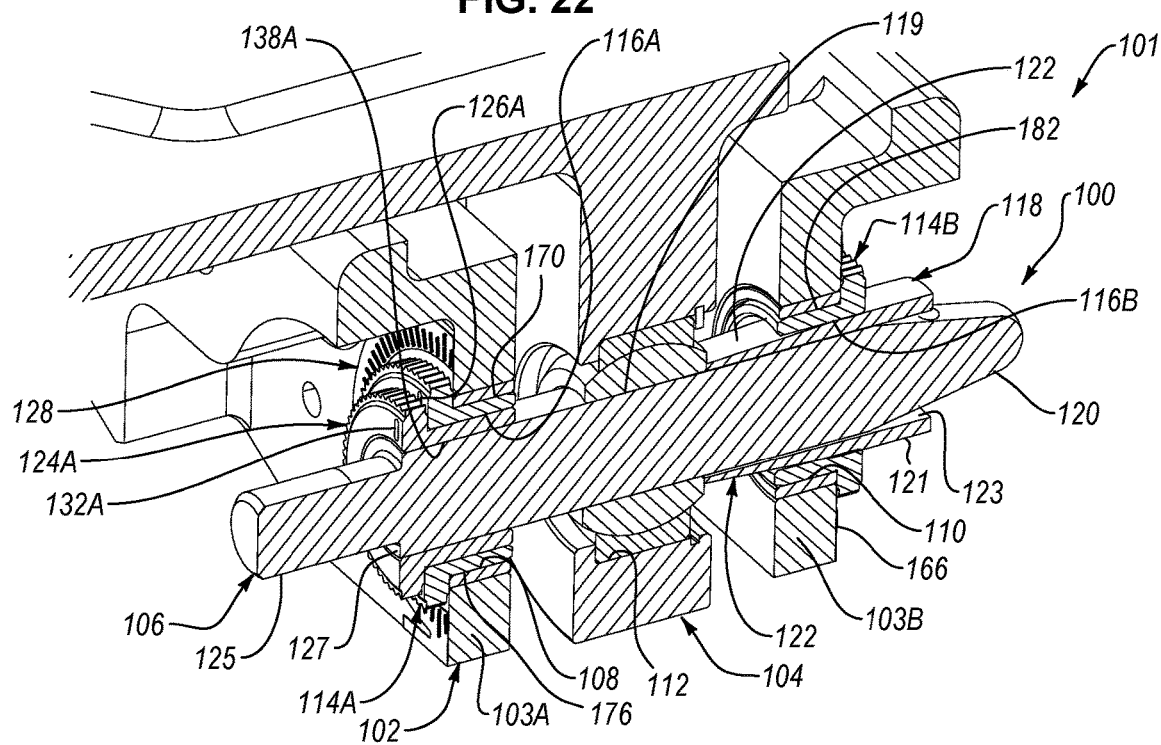
FIG. 23 is a schematic, perspective, sectional view of the clevis, the lug, and the coupling system of FIG. 1A, according to one or more examples of the subject matter, disclosed herein.
Figure 24:
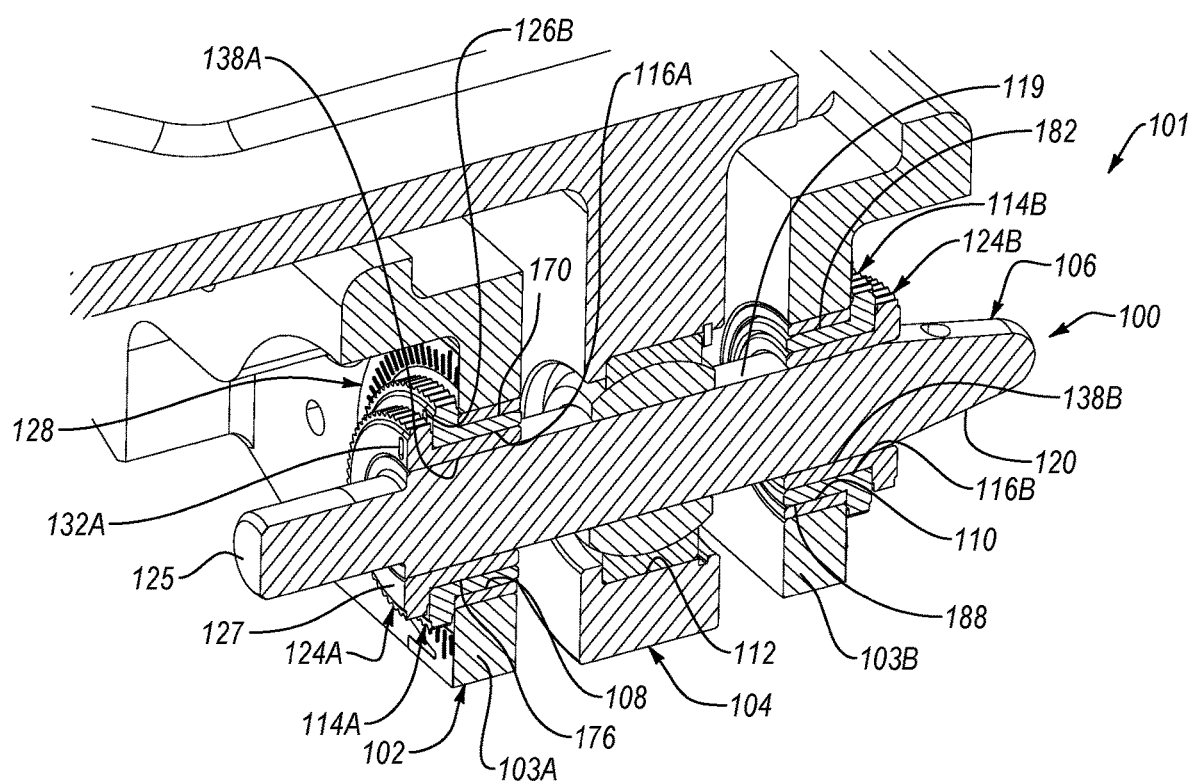
FIG. 24 is a schematic, perspective, sectional view of the clevis, the lug, and the coupling system of FIG. 1A, according to one or more examples of the subject matter, disclosed herein.
Figure 25:
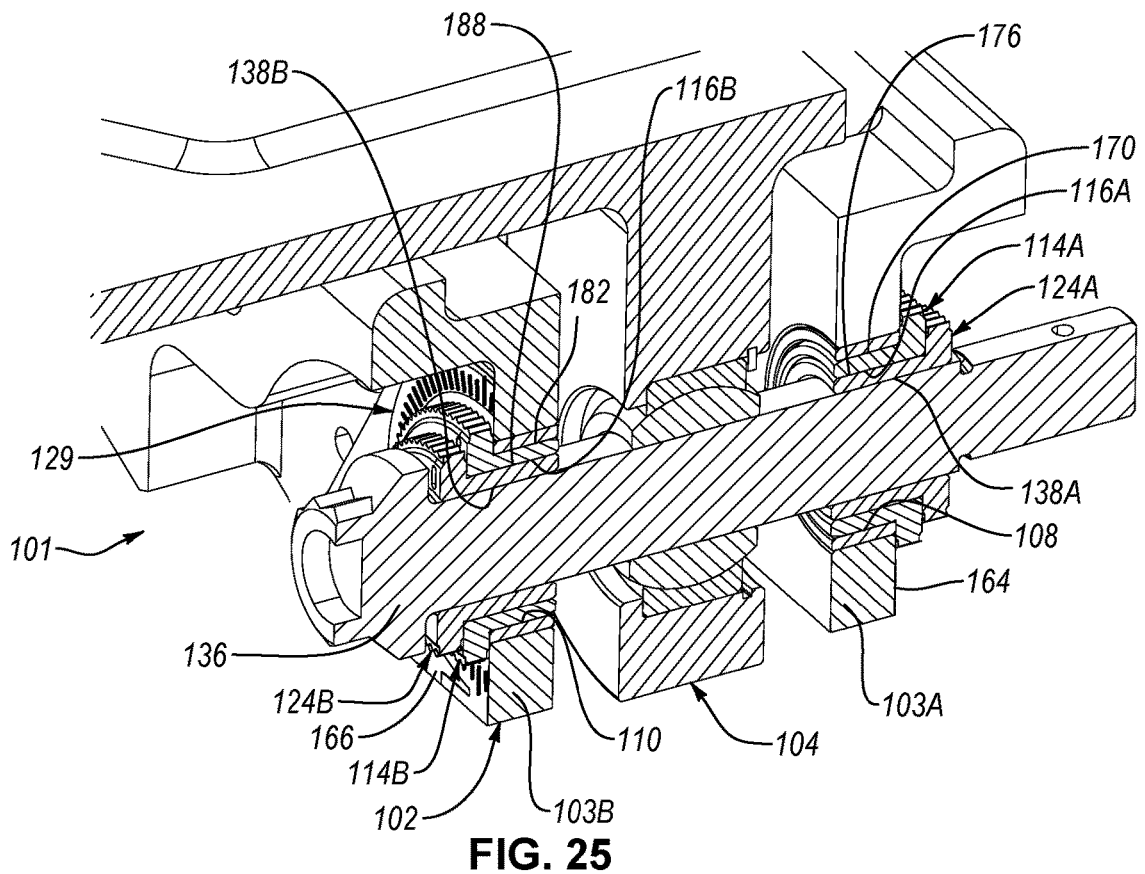
FIG. 25 is a schematic, perspective, sectional view of the clevis, the lug, and the coupling system of FIG. 1A, according to one or more examples of the subject matter, disclosed herein.
Figure 26:
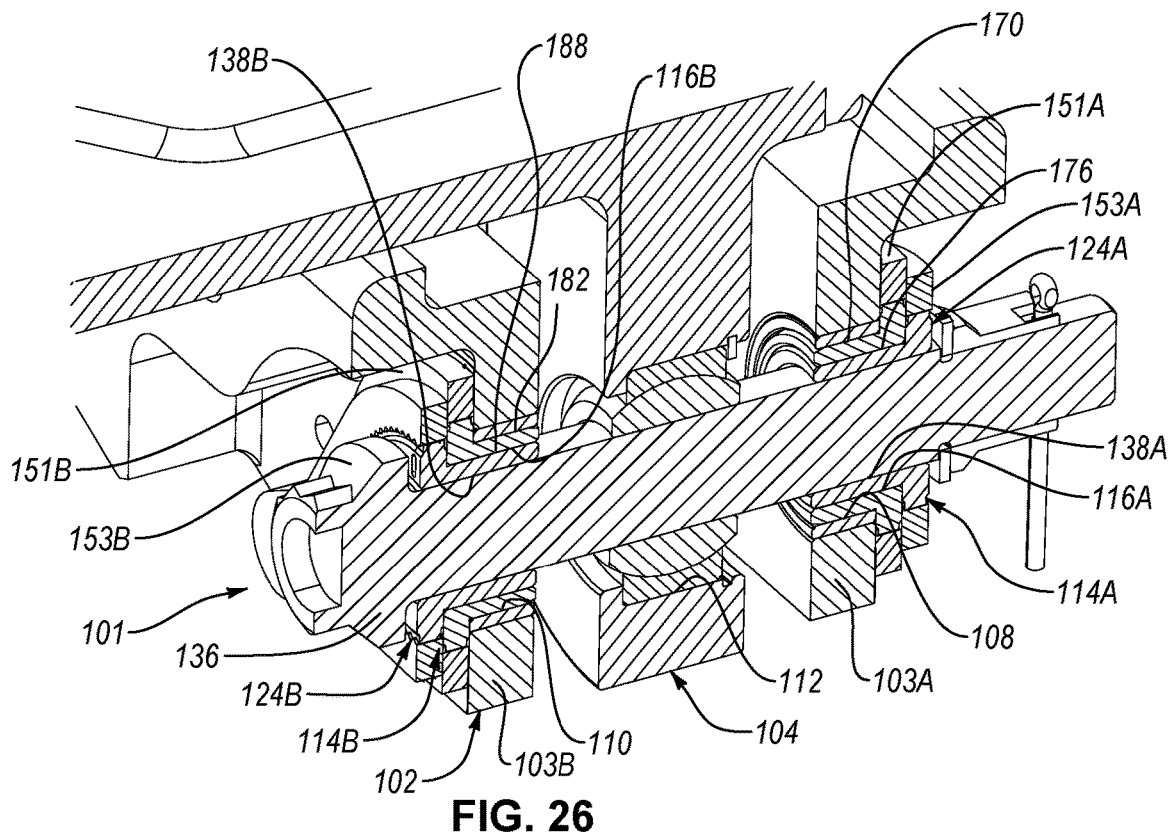
FIG. 26 is a schematic, perspective, sectional view of the clevis, the lug, and the coupling system of FIG. 1A, according to one or more examples of the subject matter, disclosed herein.
Figure 27:
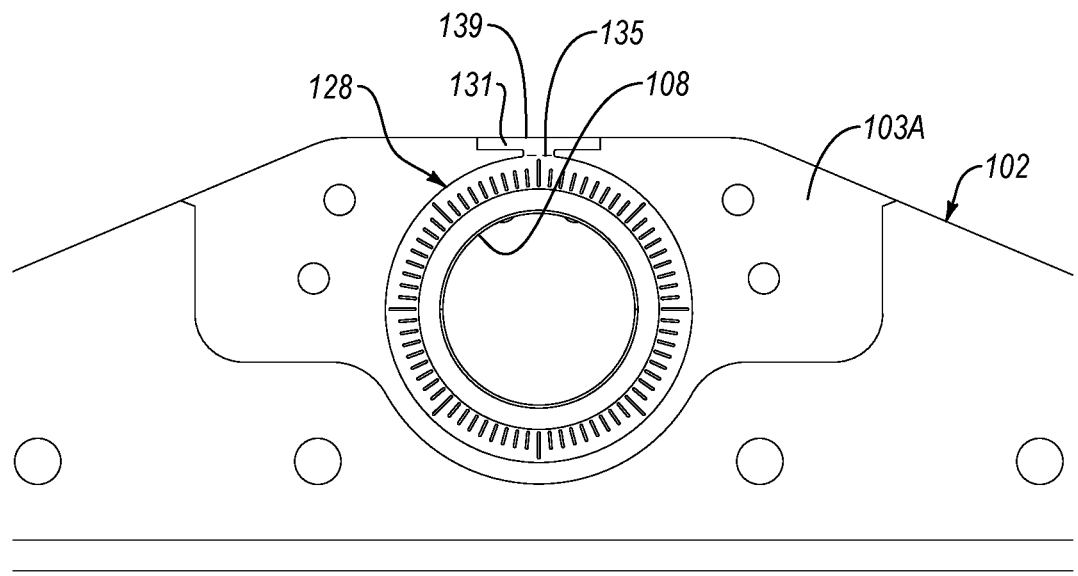
FIG. 27 is a schematic, elevation view of the clevis of FIG. 1A and a first protractor of tooling of the coupling system of FIG. 1A, according to one or more examples of the subject matter, disclosed herein.
Figure 28:
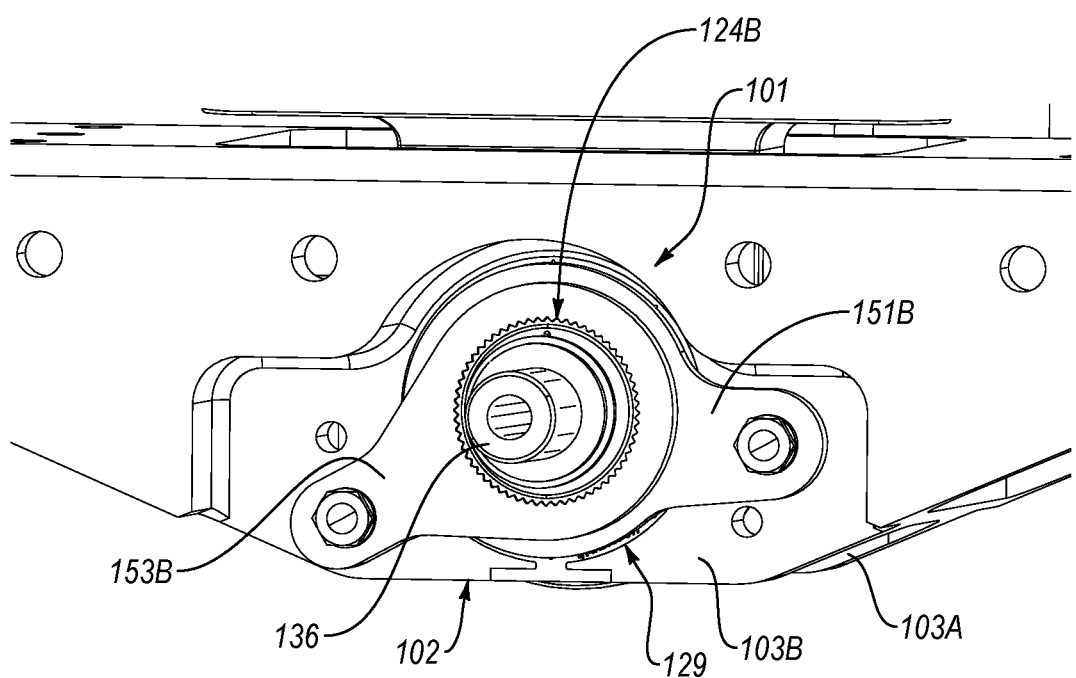
FIG. 28 is a schematic, perspective view of the clevis, the lug, and the coupling system of FIG. 1A, according to one or more examples of the subject matter, disclosed herein.

Referring generally to FIGS. 1A and 1C and particularly to, e.g., FIG. 17 for illustrative purposes only and not by way of limitation, the following portion of this paragraph delineates example 14 of the subject matter, disclosed herein. According to example 14, which encompasses any one of examples 1 to 13, above, sleeve 118 further comprises holes 187, extending from sleeve cylindrical outer surface 121 to sleeve interior channel 123. Holes 187 are on opposite sides of sleeve 118 from each other. Tooling 100 further comprises rod 189, configured to extend through holes 187 in a direction, perpendicular to sleeve-cylindrical-outer-surface central axis 160.

Rod 189, when extended through holes 187 of sleeve 118, enable pulling sleeve 118 relative to clevis 102 and rotating sleeve 118 relative to clevis 102.

Referring generally to FIGS. 1A, 1B, and 1C and particularly to, e.g., FIGS. 4-24 and 27 for illustrative purposes only and not by way of limitation, the following portion of this paragraph delineates example 15 of the subject matter, disclosed herein. According to example 15, a first method of using tooling 100 for clocking the dual eccentric bushings of clevis 102 so that clevis 102 and lug 104, which comprises through opening 112 and spherical bearing 140, located in through opening 112, can be pinned together comprises a step of, with lug 104 positioned between first leg 103A and second leg 103B of clevis 102 such that pin cylindrical portion 119 is capable of simultaneously extending through first-leg opening 108 in first leg 103A of clevis 102, through spherical bearing 140 in through opening 112 of lug 104, and through second-leg opening 110 of second leg 103B of clevis 102, inserting pin 106, in a first translational direction relative to clevis 102, through second-leg opening 110, through spherical bearing 140 in through opening 112 of lug 104, and through first-leg opening 108. Spherical bearing 140 is configured to receive pin cylindrical portion 119 with a slip fit. The first method further comprises a step of, with plate-engagement portion 125 of pin 106 received within squaring-plate opening 152 with a slip fit, and with a portion of squaring-plate abutment surface 154 contacting stop surface 127 of pin 106, abutting squaring-plate abutment surface 154 against second-leg abutment surface 166 of second leg 103B of clevis 102 so that pin central axis 148 is parallel to or collinear with first-leg-opening central axis 144 of first-leg opening 108 and is parallel to or collinear with second-leg-opening central axis 146 of second-leg opening 110, and so that pin cylindrical portion 119 extends through second-leg opening 110, through spherical bearing 140 in through opening 112 of lug 104, and through first-leg opening 108. also comprises a step of biasing first outer eccentric bushing 114A in a second translational direction relative to clevis 102, opposite the first translational direction, until pin cylindrical portion 119 is received into first-outer-eccentric-bushing opening 116A of first outer eccentric bushing 114A and first-outer-eccentric-bushing exterior cylindrical surface 170 of first outer eccentric bushing 114A is received with a slip fit into first-leg opening 108. First-outer-eccentric-bushing exterior cylindrical surface 170 has first-outer-eccentric-bushing-exterior-cylindrical-surface central axis 172. First-outer-eccentric-bushing opening 116A has first-outer-eccentric-bushing-opening central axis 174 that is offset from and is parallel to first-outer-eccentric-bushing-exterior-cylindrical-surface central axis 172. Sleeve cylindrical outer surface 121 is configured to be received within first-outer-eccentric-bushing opening 116A with a slip fit. The first method further comprises of a step of, with pin cylindrical portion 119 extending through first-outer-eccentric-bushing opening 116A, biasing sleeve 118 in second translational direction relative to clevis 102 while rotating at least one of sleeve 118 or first outer eccentric bushing 114A relative to clevis 102 until pin cylindrical portion 119 is received within sleeve interior channel 123 with the slip fit, portion of sleeve cylindrical outer surface 121 is received with a slip fit within first-outer-eccentric-bushing opening 116A, first outer eccentric bushing 114A is in first angular orientation relative to clevis 102, and sleeve 118 is in a second angular orientation relative to clevis 102. The first method also comprises of a step of removing sleeve 118 from first-outer-eccentric-bushing opening 116A in second translational direction relative to clevis 102, while maintaining first outer eccentric bushing 114A in first angular orientation relative to clevis 102. The first method additionally comprises of a step of, while maintaining first outer eccentric bushing 114A in first angular orientation relative to clevis 102, biasing first inner eccentric bushing 124A, which comprises first-inner-eccentric-bushing exterior cylindrical surface 176 that has a diameter, identical to the sleeve-cylindrical-outer-surface diameter SCOSD, and that also has first-inner-eccentric-bushing-exterior-cylindrical-surface central axis 178, and which first inner eccentric bushing 124A also comprises first-inner-eccentric-bushing opening 138A that is cylindrical, that has a diameter, identical to the sleeve-interior-channel diameter SICD, and that has first-inner-eccentric-bushing-opening central axis 180, which is parallel to first-inner-eccentric-bushing-exterior-cylindrical-surface central axis 178 and is offset from first-inner-eccentric-bushing-exterior-cylindrical-surface central axis 178 by a distance, equal to the sleeve-minimum-offset distance SMOS, in the second translational direction relative to clevis 102, with first inner eccentric bushing 124A in the second angular orientation relative to clevis 102, until at least a portion of first-inner-eccentric-bushing exterior cylindrical surface 176 is received with a slip fit within first-outer-eccentric-bushing opening 116A. The first method also comprises a step of, while maintaining first outer eccentric bushing 114A in the first angular orientation relative to clevis 102 and first inner eccentric bushing 124A in the second angular orientation relative to clevis 102, removing pin 106, in the second translational direction relative to clevis 102, from sleeve interior channel 123, from spherical bearing 140 in through opening 112 of lug 104, and from second-leg opening 110 before the step of removing sleeve 118 from first-outer-eccentric-bushing opening 116A, or removing pin 106, in the second translational direction relative to clevis 102, from first-outer-eccentric-bushing opening 116A, from spherical bearing 140 in through opening 112 of lug 104, and from second-leg opening 110 after the step of removing sleeve 118 from first-outer-eccentric-bushing opening 116A and before biasing first inner eccentric bushing 124A in the second translational direction relative to clevis 102 until at least the portion of first-inner-eccentric-bushing exterior cylindrical surface 176 is received with the slip fit within first-outer-eccentric-bushing opening 116A, or removing pin 106, in the second translational direction relative to clevis 102, from first-inner-eccentric-bushing opening 138A, from spherical bearing 140 in through opening 112 of lug 104, and from second-leg opening 110 after step of removing sleeve 118 from first-outer-eccentric-bushing opening 116A and after biasing first inner eccentric bushing 124A, in the second translational direction relative to clevis 102, until at least the portion of first-inner-eccentric-bushing exterior cylindrical surface 176 is received with the slip fit within first-outer-eccentric-bushing opening 116A. The first method further comprises a step of, with first outer eccentric bushing 114A in the first angular orientation relative to clevis 102 and first inner eccentric bushing 124A in second angular orientation relative to clevis 102, inserting pin 106, in the second translational direction relative to clevis 102, through first-inner-eccentric-bushing opening 138A with the slip fit, through spherical bearing 140 in through opening 112 of lug 104 with the slip fit, and through second-leg opening 110. The first method also comprises a step of biasing second outer eccentric bushing 114B in the first translational direction relative to clevis 102 until pin cylindrical portion 119 is received into second-outer-eccentric-bushing opening 116B of second outer eccentric bushing 114B, and second-outer-eccentric-bushing exterior cylindrical surface 182 of second outer eccentric bushing 114B is received with a slip fit within second-leg opening 110. Second-outer-eccentric-bushing exterior cylindrical surface 182 comprises second-outer-eccentric-bushing-exterior-cylindrical-surface central axis 184. Second-outer-eccentric-bushing opening 116B has second-outer-eccentric-bushing-opening central axis 186 that is offset from and is parallel to second-outer-eccentric-bushing-exterior-cylindrical-surface central axis 184. Sleeve cylindrical outer surface 121 is configured to be received within second-outer-eccentric-bushing opening 116B with a slip fit. The first method also comprises a step of, with pin cylindrical portion 119 extending through second-outer-eccentric-bushing opening 116B, biasing sleeve 118 in the first translational direction relative to clevis 102 while rotating at least one of sleeve 118 or second outer eccentric bushing 114B relative to clevis 102 until pin cylindrical portion 119 is received within sleeve interior channel 123 with the slip fit, a portion of sleeve cylindrical outer surface 121 is received with a slip fit within second-outer-eccentric-bushing opening 116B, second outer eccentric bushing 114B is in a third angular orientation relative to clevis 102, and sleeve 118 is in a fourth angular orientation relative to clevis 102. The first method additionally comprises a step of removing sleeve 118 from second-outer-eccentric-bushing opening 116B in second translational direction relative to clevis 102, while maintaining second outer eccentric bushing 114B in third angular orientation relative to clevis 102. The first method also comprises a step of, while maintaining second outer eccentric bushing 114B in the third angular orientation relative to clevis 102, biasing second inner eccentric bushing 124B, which comprises second-inner-eccentric-bushing exterior cylindrical surface 188 that has a diameter, identical to the sleeve-cylindrical-outer-surface diameter SCOSD, and that also has second-inner-eccentric-bushing-exterior-cylindrical-surface central axis 190; and which second inner eccentric bushing 124B also comprises second-inner-eccentric-bushing opening 138B that is cylindrical, that has a diameter, identical to the sleeve-interior-channel diameter SICD, and that has second-inner-eccentric-bushing-opening central axis 192, which is parallel to second-inner-eccentric-bushing-exterior-cylindrical-surface central axis 190 and is offset from second-inner-eccentric-bushing-exterior-cylindrical-surface central axis 190 by a distance, equal to the sleeve-minimum-offset distance SMOS, in the first translational direction relative to clevis 102, with second inner eccentric bushing 124B in the fourth angular orientation relative to clevis 102, until at least a portion of second-inner-eccentric-bushing exterior cylindrical surface 188 of second inner eccentric bushing 124B is received with a slip fit within second-outer-eccentric-bushing opening 116B. The first method further comprises a step of, while maintaining first outer eccentric bushing 114A in the first angular orientation relative to clevis 102, first inner eccentric bushing 124A in second angular orientation relative to clevis 102, second outer eccentric bushing 114B in third angular orientation relative to clevis 102, and second inner eccentric bushing 124B in the fourth angular orientation relative to clevis 102, removing pin 106, in the first translational direction relative to clevis 102, from sleeve interior channel 123, from spherical bearing 140 in through opening 112 of lug 104, and from first-inner-eccentric-bushing opening 138A before removing sleeve 118 from second-outer-eccentric-bushing opening 116B, or removing pin 106, in the first translational direction relative to clevis 102, from second-outer-eccentric-bushing opening 116B, from spherical bearing 140 in through opening 112 of lug 104, and from first-inner-eccentric-bushing opening 138A after step of removing sleeve 118 from second-outer-eccentric-bushing opening 116B and before the step of biasing second inner eccentric bushing 124B in the first translational direction relative to clevis 102 until at least the portion of second-inner-eccentric-bushing exterior cylindrical surface 188 is received with the slip fit within second-outer-eccentric-bushing opening 116B, or removing pin 106, in the first translational direction relative to clevis 102, from second-inner-eccentric-bushing opening 138B, from spherical bearing 140 in through opening 112 of lug 104, and from first-inner-eccentric-bushing opening 138A after step of removing sleeve 118 from second-outer-eccentric-bushing opening 116A and after the step of biasing second inner eccentric bushing 124B in the first translational direction relative to clevis 102 until at least the portion of second-inner-eccentric-bushing exterior cylindrical surface 188 is received with the slip fit within second-outer-eccentric-bushing opening 116B.

The first method promotes the clocking of dual eccentric bushings of clevis 102 in an efficient manner. Clocking of the dual eccentric bushings of clevis 102 enables clevis 102 and lug 104 to be pinned together when lug 104 is positioned in gap 105 defined between first leg 103A and second leg 103B of clevis 102. Dual eccentric bushings and spherical bearing 140 help to accommodate pinning together clevis 102 and lug 104 when clevis 102 and lug 104 are misaligned. Abutting squaring-plate abutment surface 154 against second-leg abutment surface 166, when plate-engagement portion 125 of pin 106 is received within squaring-plate opening 152 with the slip fit, enables pin central axis 148 to be square with clevis 102. Stop surface 127 of pin 106 keeps pin 106 from passing through squaring-plate opening 152 when squaring-plate abutment surface 154 contacts stop surface 127 of pin 106. Pin cylindrical portion 119 mimics locking pin 136 that is used to pin together clevis 102 and lug 104. Biasing sleeve 118 in the second translational direction while rotating at least one of sleeve 118 or first outer eccentric bushing 114A relative to clevis 102 until pin cylindrical portion 119 is received within sleeve interior channel 123 with the slip fit, and the portion of sleeve cylindrical outer surface 121 is received with the slip fit within first-outer-eccentric-bushing opening 116A facilitates first outer eccentric bushing 114A being in a proper position and angular orientation for clocking first outer eccentric bushing 114A with first inner eccentric bushing 124A. In some examples, sleeve 118 is biased in the second translation direction while rotating at least one of sleeve 118 or first outer eccentric bushing 114A until an entirety of pin tapered end portion 120 passes at least partially through first-outer-eccentric-bushing opening 116A. Sleeve 118, having sleeve-cylindrical-outer-surface diameter SCOSD identical to the diameter of first-inner-eccentric-bushing exterior cylindrical surface 176, sleeve-interior-channel diameter SICD identical to the diameter of first-inner-eccentric-bushing opening 138A, and sleeve-minimum-offset distance SMOS equal to a distance between first-inner-eccentric-bushing-exterior-cylindrical-surface central axis 178 and is offset from the first-inner-eccentric-bushing-exterior-cylindrical-surface central axis 178 enables sleeve 118 to replicate first inner eccentric bushing 124A and provides a proper angular orientation for first inner eccentric bushing 124A to clock with first outer eccentric bushing 114A. Biasing sleeve 118 in the first translational direction while rotating at least one of sleeve 118 or second outer eccentric bushing 114B relative to clevis 102 until pin cylindrical portion 119 is received within sleeve interior channel 123 with the slip fit, and the portion of sleeve cylindrical outer surface 121 is received with the slip fit within second-outer-eccentric-bushing opening 116B facilitates second outer eccentric bushing 114A being in a proper position and angular orientation for clocking second outer eccentric bushing 114A with second inner eccentric bushing 124B. In some examples, sleeve 118 is biased in the first translation direction while rotating at least one of sleeve 118 or second outer eccentric bushing 114B until an entirety of pin tapered end portion 120 passes at least partially through second-outer-eccentric-bushing opening 116B. Sleeve 118, having sleeve-cylindrical-outer-surface diameter SCOSD identical to the diameter of second-inner-eccentric-bushing exterior cylindrical surface 188, sleeve-interior-channel diameter SICD identical to the diameter of second-inner-eccentric-bushing opening 138B, and sleeve-minimum-offset distance SMOS equal to a distance between second-inner-eccentric-bushing-exterior-cylindrical-surface central axis 190 and is offset from second-inner-eccentric-bushing-exterior-cylindrical-surface central axis 190 enables sleeve 118 to replicate second inner eccentric bushing 124B and provides a proper angular orientation for second inner eccentric bushing 124B to clock with second outer eccentric bushing 114B. Accordingly, the first method facilitates clocking of two pair of dual eccentric bushings of clevis 102 so that clevis 102 and lug 104 can be pinned together.

Figure 8A:
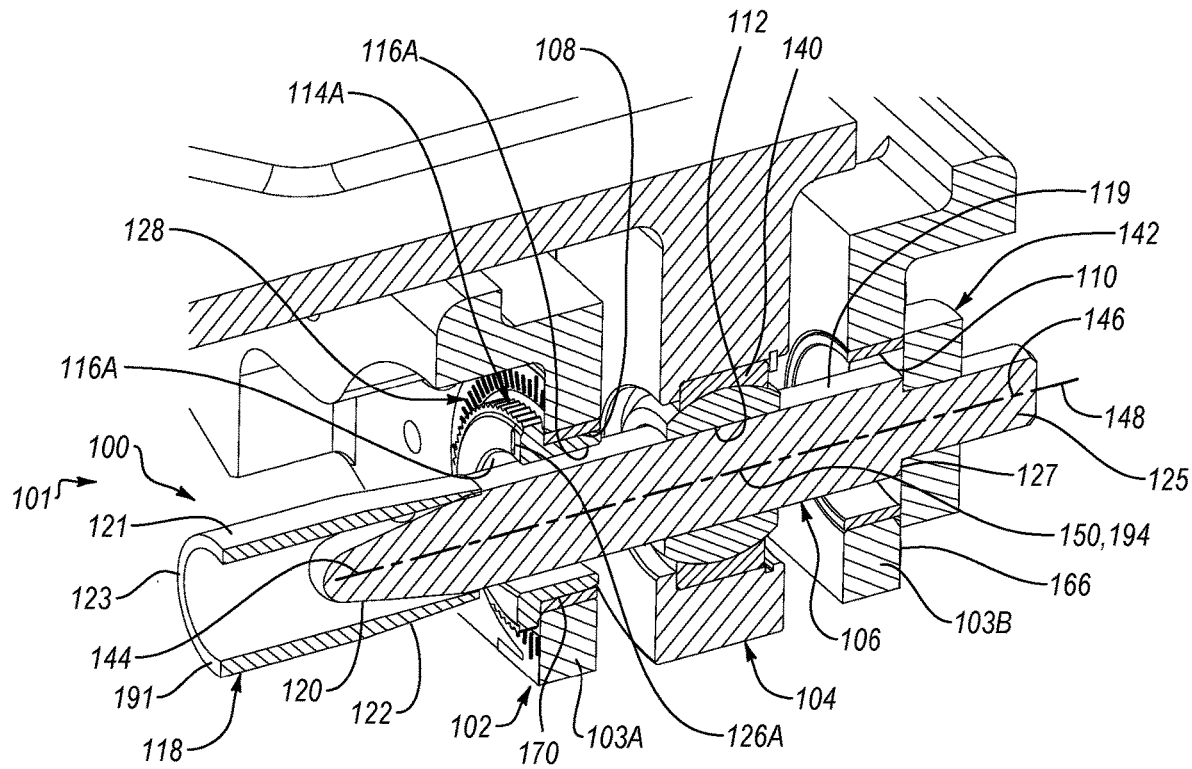
FIG. 8A is a schematic, perspective, sectional view of the clevis, the lug, and the coupling system of FIG. 1A, according to one or more examples of the subject matter, disclosed herein.
Figure 8B:
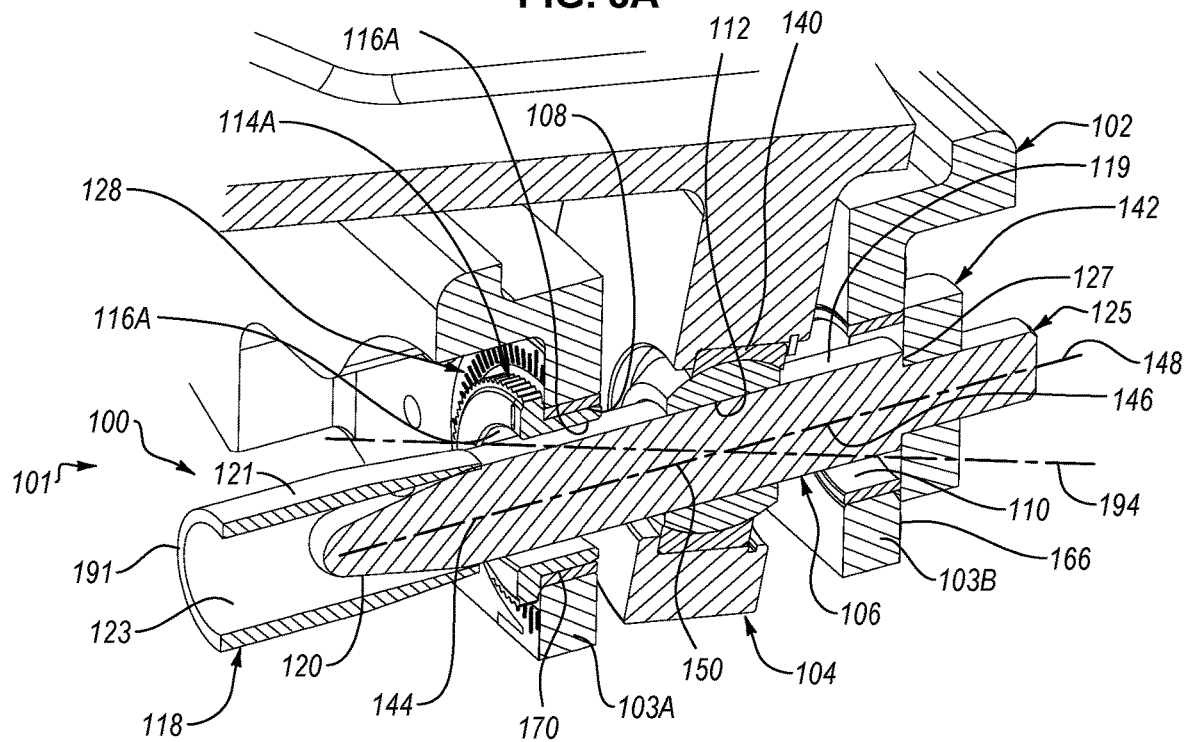
FIG. 8B is a schematic, perspective, sectional view of the clevis, the lug, and the coupling system of FIG. 1A, according to one or more examples of the subject matter, disclosed herein.
Figure 9:
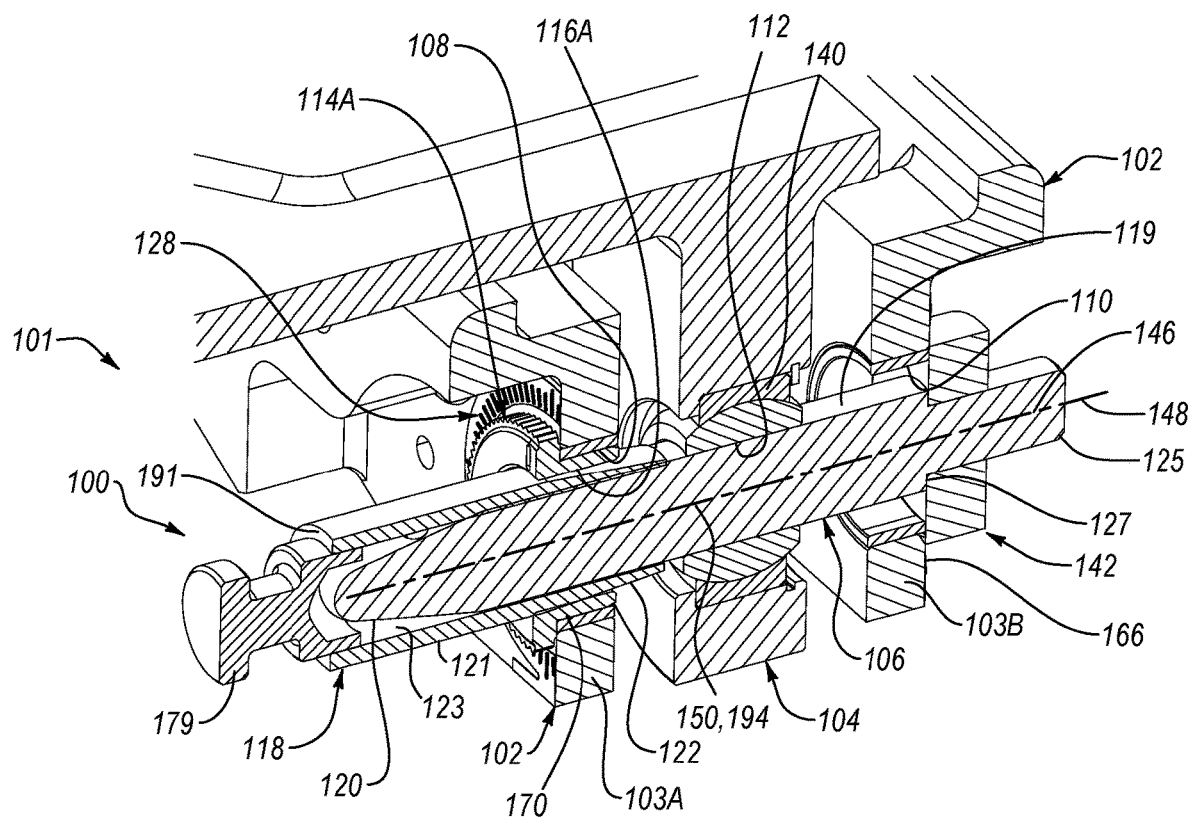
FIG. 9 is a schematic, perspective, sectional view of the clevis, the lug, and the coupling system of FIG. 1A, according to one or more examples of the subject matter, disclosed herein.
Figure 10:
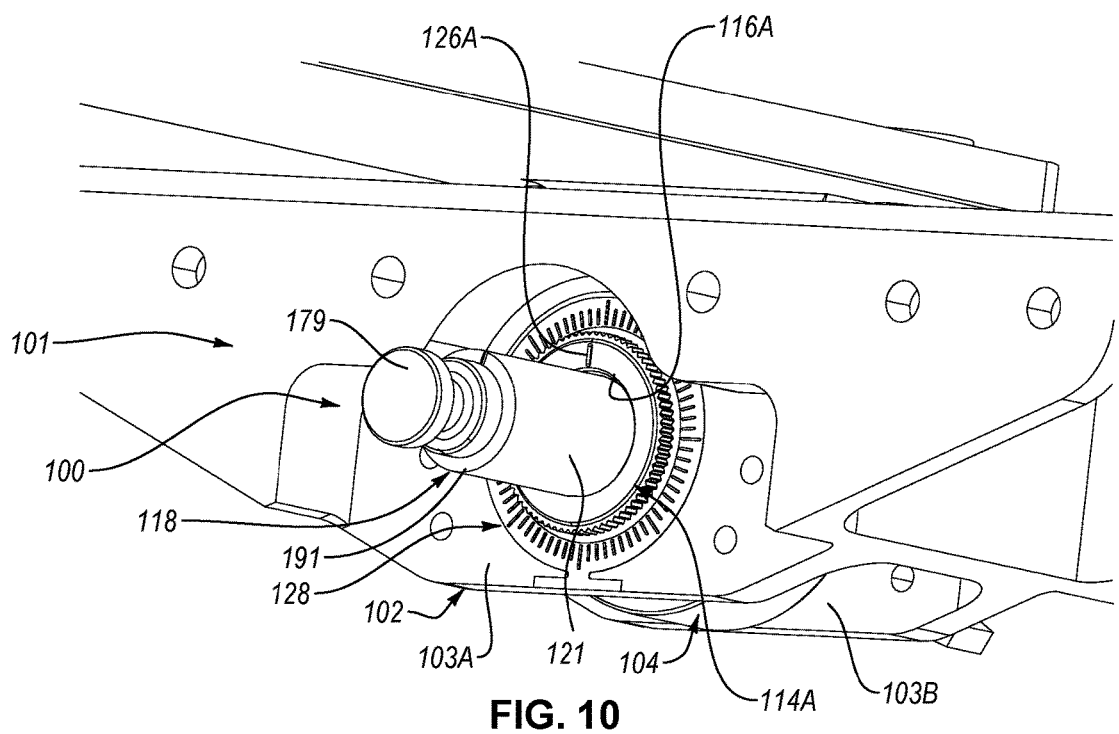
FIG. 10 is a schematic, perspective view of the clevis, the lug, and the coupling system of FIG. 1A, according to one or more examples of the subject matter, disclosed herein.
Figure 11:
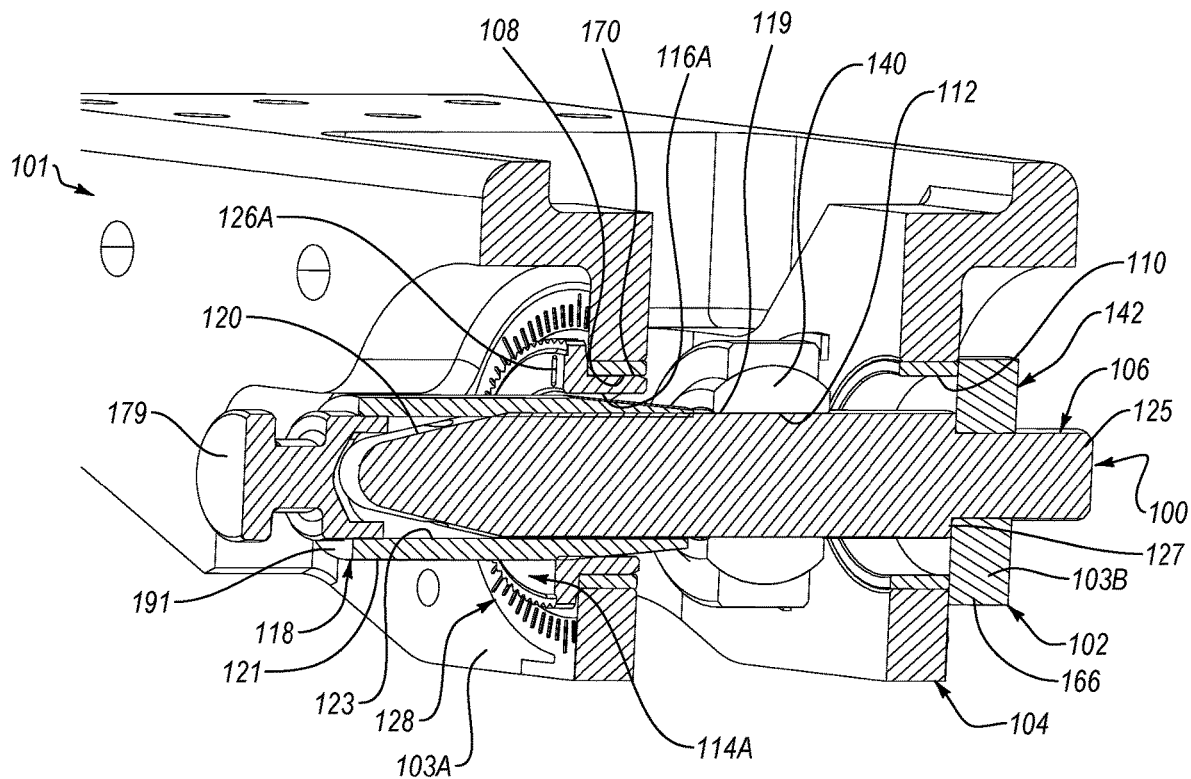
FIG. 11 is a schematic, perspective, sectional view of the clevis, the lug, and the coupling system of FIG. 1A, according to one or more examples of the subject matter, disclosed herein.

Referring to FIGS. 8A and 8B, spherical bearing 140 has spherical-bearing central axis 150 and is adjustable such that spherical-bearing central axis 150 can be concentric with or non-concentric with lug-opening central axis 194 of through opening 112. Spherical-bearing central axis 150 is non-concentric with lug-opening central axis 194 when clevis 102 and lug 104 are misaligned.

As used herein, "to bias" means to continuously apply a force, which may or may not have a constant magnitude, but is always applied in the same direction and has a magnitude greater than zero.

Referring generally to FIGS. 1A, 1B, and 1C for illustrative purposes only and not by way of limitation, the following portion of this paragraph delineates example 16 of the subject matter, disclosed herein. According to example 16, which encompasses example 15, above, the step of rotating at least one of sleeve 118 or first outer eccentric bushing 114A relative to clevis 102 comprises a step of rotating sleeve 118 in first rotational direction relative to clevis 102 and a step of rotating first outer eccentric bushing 114A in second rotational direction relative to clevis 102. The first rotational direction is opposite the second rotational direction.

Rotating sleeve 118 and first outer eccentric bushing 114A in opposite directions relative to clevis 102 enables efficient locating of first outer eccentric bushing 114A in the first angular orientation relative to clevis 102 and efficient locating of sleeve 118 in the second angular orientation relative to clevis 102.

Referring generally to FIGS. 1A, 1B, and 1C and particularly to, e.g., FIGS. 4-6, 8A-11, 14A, and 16-18 for illustrative purposes only and not by way of limitation, the following portion of this paragraph delineates example 17 of the subject matter, disclosed herein. According to example 17, which encompasses example 15 or 16, above, the step of rotating at least one of sleeve 118 or first outer eccentric bushing 114A relative to clevis 102 comprises rotating sleeve 118 and first outer eccentric bushing 114A relative to clevis 102 at different rates.

Rotating sleeve 118 and first outer eccentric bushing 114A relative to clevis 102 in the same direction at different rates enables efficient locating of first outer eccentric bushing 114A in the first angular orientation relative to clevis 102 and efficient locating of sleeve 118 in the second angular orientation relative to clevis 102.

Referring generally to FIGS. 1A, 1B, and 1C and particularly to, e.g., FIGS. 15A and 22-24 for illustrative purposes only and not by way of limitation, the following portion of this paragraph delineates example 18 of the subject matter, disclosed herein. According to example 18, which encompasses any one of examples 15 to 17, above, the step of rotating at least one of sleeve 118 or second outer eccentric bushing 114B relative to clevis 102 comprises rotating sleeve 118 in a first rotational direction relative to clevis 102 and rotating second outer eccentric bushing 114B in a second rotational direction relative to clevis 102. The first rotational direction is opposite the second rotational direction.

Rotating sleeve 118 and second outer eccentric bushing 114B in opposite directions relative to clevis 102 enables efficient locating of second outer eccentric bushing 114B in the third angular orientation relative to clevis 102 and efficient locating of sleeve 118 in the fourth angular orientation relative to clevis 102.

Referring generally to FIGS. 1A, 1B, and 1C and particularly to, e.g., FIGS. 15A and 22-24 for illustrative purposes only and not by way of limitation, the following portion of this paragraph delineates example 19 of the subject matter, disclosed herein. According to example 19, which encompasses any one of examples 15 to 18, above, the step of rotating at least one of sleeve 118 or second outer eccentric bushing 114B relative to clevis 102 comprises rotating sleeve 118 and second outer eccentric bushing 114B relative to clevis 102 at different rates.

Rotating sleeve 118 and second outer eccentric bushing 114B in opposite directions relative to clevis 102 enables efficient locating of second outer eccentric bushing 114B in the third angular orientation relative to clevis 102 and efficient locating of sleeve 118 in the fourth angular orientation relative to clevis 102.

Referring generally to FIGS. 1A, 1B, and 1C and particularly to, e.g., FIGS. 8A-12 and 14A-24 for illustrative purposes only and not by way of limitation, the following portion of this paragraph delineates example 20 of the subject matter, disclosed herein. According to example 20, which encompasses any one of examples 15 to 19, above, the first method further uses tooling 100 of example 5 and further comprises steps of coupling first protractor 128 to first-leg abutment surface 164 of first leg 103A of clevis 102 around first-leg opening 108 of first leg 103A of clevis 102 and coupling second protractor 129 to second-leg abutment surface 166 of second leg 103B of clevis 102 around second-leg opening 110 of second leg 103B of clevis 102.

Coupling first protractor 128 to first-leg abutment surface 164 around first-leg opening 108 provides a guide for orienting first inner eccentric bushing 124A in the second angular orientation relative to clevis 102 when first inner eccentric bushing 124A is biased in the second translational direction. Coupling second protractor 129 to second-leg abutment surface 166 around second-leg opening 110 provides a guide for orienting second inner eccentric bushing 124B in the fourth angular orientation relative to clevis 102 when second inner eccentric bushing 124B is biased in the first translational direction.

Figure 14A:
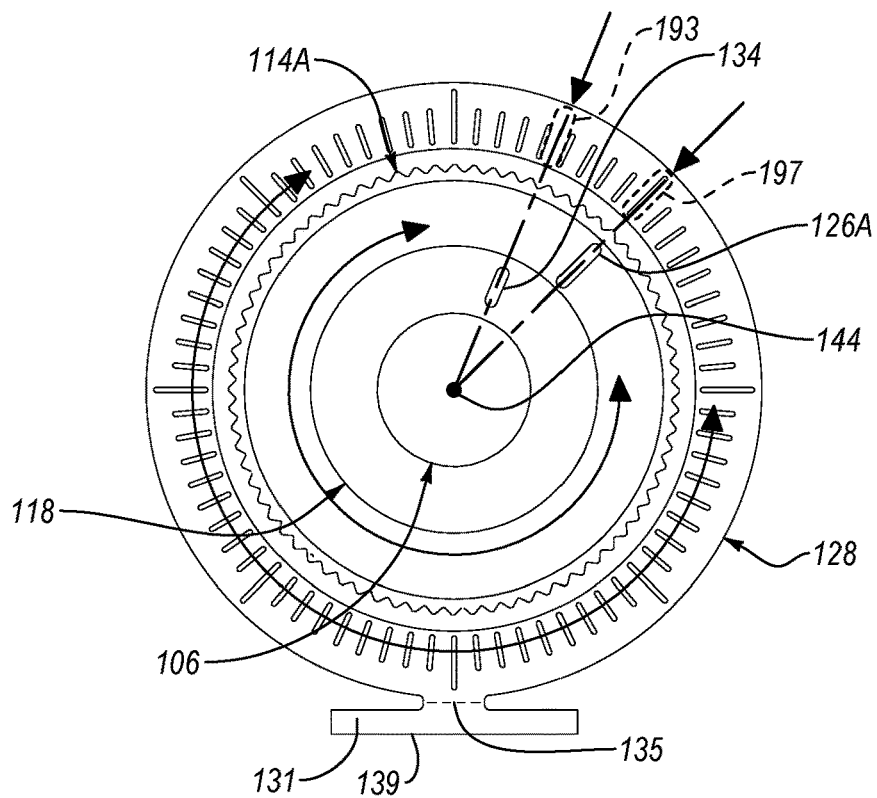
FIG. 14A is a schematic, elevation view of a first outer eccentric bushing of the coupling system of FIG. 1A and of a first protractor and a sleeve of tooling of the coupling system of FIG. 1A, according to one or more examples of the subject matter, disclosed herein.
Figure 14B:
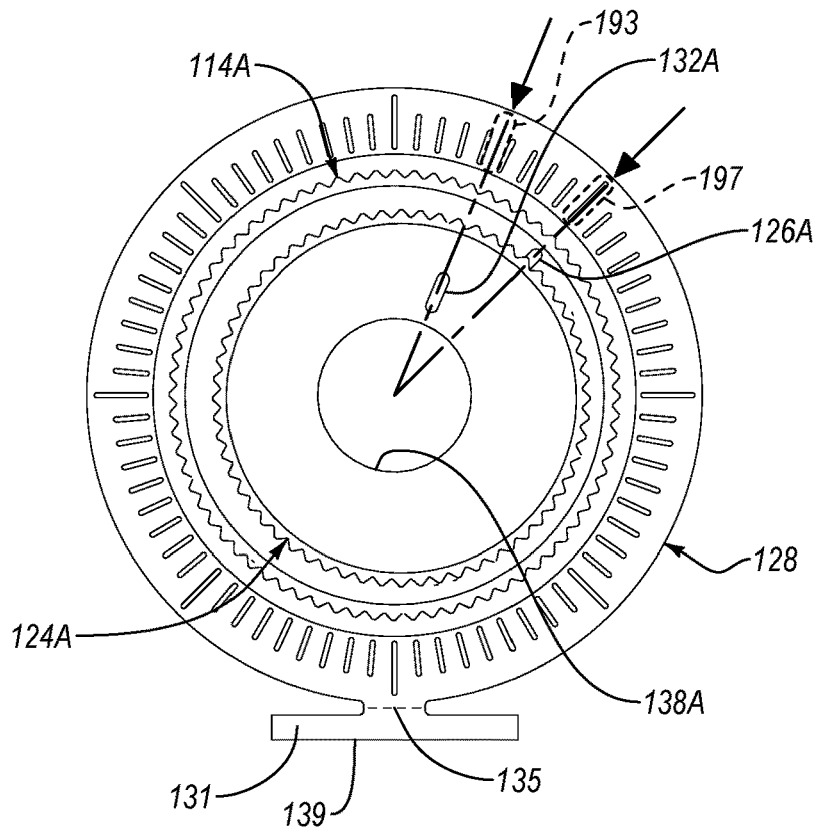
FIG. 14B is a schematic, elevation view of the first outer eccentric bushing and a first inner eccentric bushing of the coupling system of FIG. 1A and of a first protractor of tooling of the coupling system of FIG. 1A, according to one or more examples of the subject matter, disclosed herein.

Referring generally to FIGS. 1A, 1B, and 1C and particularly to, e.g., FIGS. 14A and 14B for illustrative purposes only and not by way of limitation, the following portion of this paragraph delineates example 21 of the subject matter, disclosed herein. According to example 21, which encompasses example 20, above, the first method further uses tooling 100 of example 9 and further comprises a step of applying first-inner-eccentric-bushing mark 193 onto first protractor 128 at a location that is angularly aligned with angular-orientation indicator mark 134 of sleeve 118, relative to first-leg-opening central axis 144, when sleeve 118 is in the second angular orientation relative to clevis 102 and when portion of sleeve cylindrical outer surface 121 is received with the slip fit within first-outer-eccentric-bushing opening 116A. The step of biasing first inner eccentric bushing 124A, in the second translational direction relative to clevis 102, with first inner eccentric bushing 124A in second angular orientation relative to clevis 102, comprises angularly aligning, relative to first-leg-opening central axis 144, first-inner-eccentric-bushing indicium 132A with first-inner-eccentric-bushing mark 193 on first protractor 128.

First-inner-eccentric-bushing mark 193 provides a clear visual indication, witness, and reminder of the second angular orientation relative to clevis 102, which promotes reliably locating first inner eccentric bushing 124A in the second angular orientation.

Figure 15A:
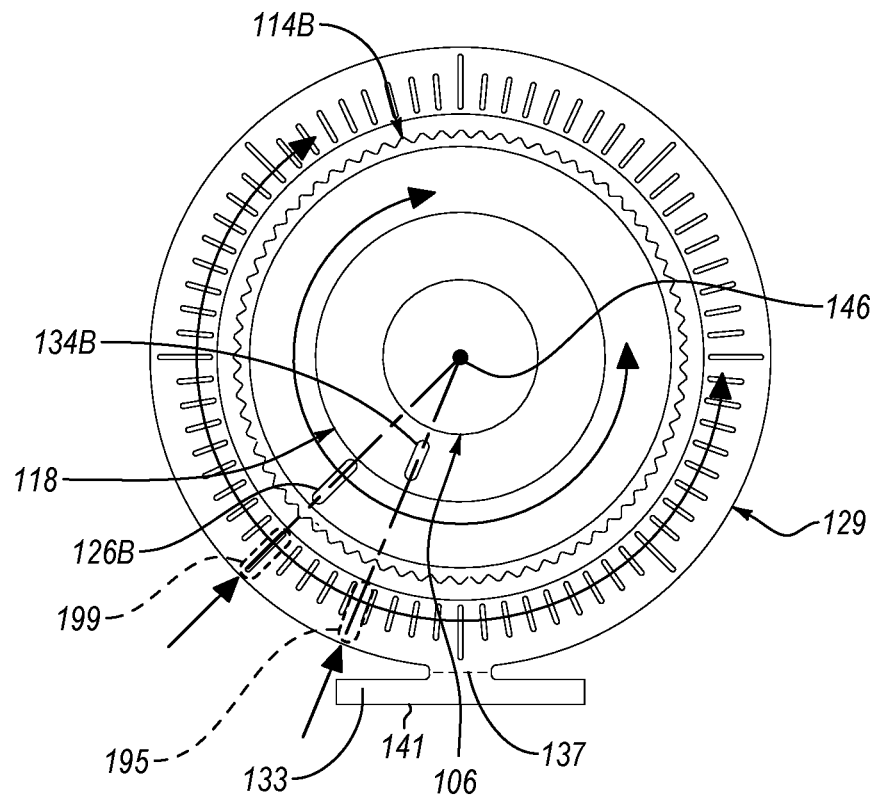
FIG. 15A is a schematic, elevation view of a second outer eccentric bushing of the coupling system of FIG. 1A and a of second protractor and a sleeve of tooling of the coupling system of FIG. 1A, according to one or more examples of the subject matter, disclosed herein.
Figure 15B:
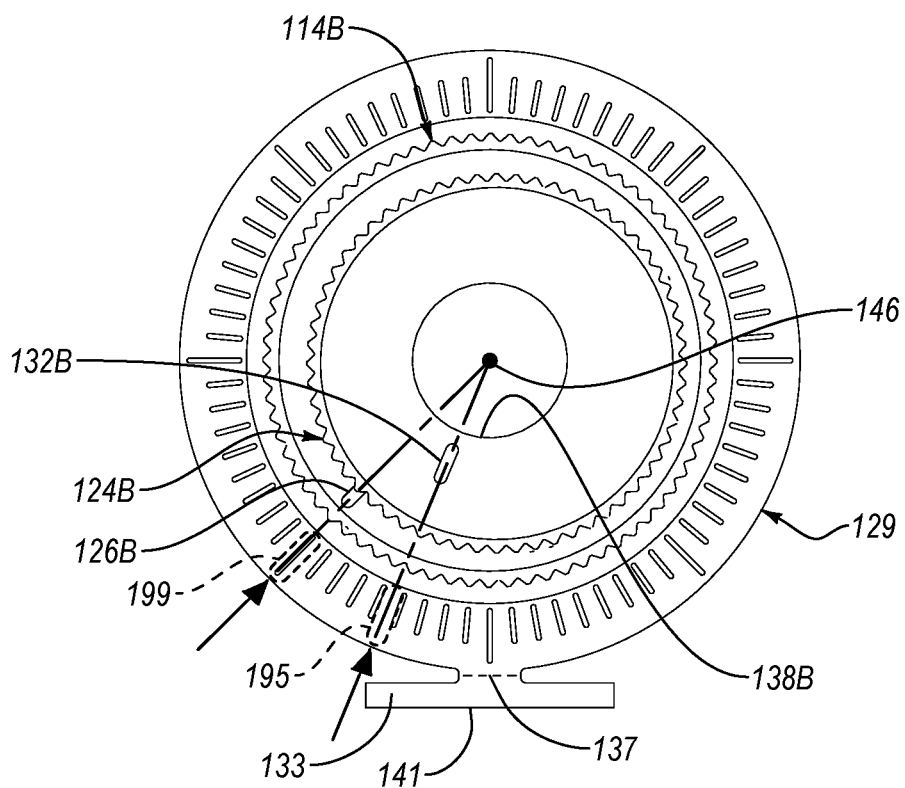
FIG. 15B is a schematic, elevation view of the second outer eccentric bushing and a second inner eccentric bushing of the coupling system of FIG. 1A and of a second protractor of tooling of the coupling system of FIG. 1A, according to one or more examples of the subject matter, disclosed herein.

Referring generally to FIGS. 1A, 1B, and 1C and particularly to, e.g., FIGS. 15A and 15B for illustrative purposes only and not by way of limitation, the following portion of this paragraph delineates example 22 of the subject matter, disclosed herein. According to example 22, which encompasses example 21, above, the first method further comprises a step of applying second-inner-eccentric-bushing mark 195 onto second protractor 129 at a location that is angularly aligned with angular-orientation indicator mark 134 of sleeve 118, relative to second-leg-opening central axis 146, when sleeve 118 is in the second angular orientation relative to clevis 102 and when the portion of sleeve cylindrical outer surface 121 is received with the slip fit within second-outer-eccentric-bushing opening 116B. The step of biasing second inner eccentric bushing 124B in the first translational direction relative to clevis 102, with second inner eccentric bushing 124B in the fourth angular orientation relative to clevis 102, comprises angularly aligning, relative to second-leg-opening central axis 146, second-inner-eccentric-bushing indicium 132B with second-inner-eccentric-bushing mark 195 on second protractor 129.

Second-inner-eccentric-bushing mark 195 provides a clear visual indication, witness, and reminder of the fourth angular orientation relative to clevis 102, which promotes reliably locating second inner eccentric bushing 124B in the fourth angular orientation.

Referring generally to FIGS. 1A, 1B, and 1C and particularly to, e.g., FIGS. 4-21 and 27 for illustrative purposes only and not by way of limitation, the following portion of this paragraph delineates example 23 of the subject matter, disclosed herein. According to example 23, a second method of using tooling 100 for clocking the dual eccentric bushings of clevis 102 so that clevis 102 and lug 104, which comprises through opening 112 and spherical bearing 140, located in through opening 112, can be pinned together, comprises a step of, with lug 104 positioned between first leg 103A and second leg 103B of clevis 102 such that pin cylindrical portion 119 is capable of simultaneously extending through first-leg opening 108 in first leg 103A of clevis 102, through spherical bearing 140 in through opening 112 of lug 104, and through second-leg opening 110 of second leg 103B of clevis 102, inserting pin 106, in a first translational direction relative to clevis 102, through second-leg opening 110, through spherical bearing 140 in through opening 112 of lug 104, and through first-leg opening 108. Spherical bearing 140 is configured to receive pin cylindrical portion 119 with slip fit. The second method also comprises a step of, with plate-engagement portion 125 of pin 106 received within squaring-plate opening 152 with a slip fit, and with a portion of squaring-plate abutment surface 154 contacting stop surface 127 of pin 106, abutting squaring-plate abutment surface 154 against second-leg abutment surface 166 of second leg 103B of clevis 102 so that pin central axis 148 is parallel to or collinear with first-leg-opening central axis 144 of first-leg opening 108 and is parallel to or collinear with second-leg-opening central axis 146 of second-leg opening 110, and so that pin cylindrical portion 119 extends through second-leg opening 110, through spherical bearing 140 in through opening 112 of lug 104, and through first-leg opening 108. The second method additionally comprises a step of biasing first outer eccentric bushing 114A in a second translational direction relative to clevis 102, opposite the first translational direction, until pin cylindrical portion 119 is received into first-outer-eccentric-bushing opening 116A of first outer eccentric bushing 114A and first-outer-eccentric-bushing exterior cylindrical surface 170 of first outer eccentric bushing 114A is received with a slip fit into first-leg opening 108. First-outer-eccentric-bushing exterior cylindrical surface 170 has an outer bushing diameter OBD and first-outer-eccentric-bushing-exterior-cylindrical-surface central axis 172. First-outer-eccentric-bushing opening 116A has first-outer-eccentric-bushing-opening central axis 174 that is offset from, by an outer bearing offset distance OBOS, and is parallel to first-outer-eccentric-bushing-exterior-cylindrical-surface central axis 172. Sleeve cylindrical outer surface 121 is configured to be received within first-outer-eccentric-bushing opening 116A with a slip fit. The second method also comprises a step of, with pin cylindrical portion 119 extending through first-outer-eccentric-bushing opening 116A, biasing sleeve 118 in the second translational direction relative to clevis 102 while rotating at least one of sleeve 118 or first outer eccentric bushing 114A relative to clevis 102 until pin cylindrical portion 119 is received within sleeve interior channel 123 with the slip fit, a portion of sleeve cylindrical outer surface 121 is received with a slip fit within first-outer-eccentric-bushing opening 116A, first outer eccentric bushing 114A is in a first angular orientation relative to clevis 102, and sleeve 118 is in a second angular orientation relative to clevis 102. The second method additionally comprises a step of removing sleeve 118, in the second translational direction relative to clevis 102, from first-outer-eccentric-bushing opening 116A while maintaining first outer eccentric bushing 114A in the first angular orientation relative to clevis 102. The second method further comprises a step of, while maintaining first outer eccentric bushing 114A in the first angular orientation relative to clevis 102, biasing first inner eccentric bushing 124A, which comprises first-inner-eccentric-bushing exterior cylindrical surface 176 that has a diameter, identical to the sleeve-cylindrical-outer-surface diameter SCOSD, and that also has first-inner-eccentric-bushing-exterior-cylindrical-surface central axis 178, and which first inner eccentric bushing 124A also comprises first-inner-eccentric-bushing opening 138A that is cylindrical, that has a diameter, identical to the sleeve-interior-channel diameter SICD, and that has first-inner-eccentric-bushing-opening central axis 180, which is parallel to first-inner-eccentric-bushing-exterior-cylindrical-surface central axis 178 and is offset from first-inner-eccentric-bushing-exterior-cylindrical-surface central axis 178 by a distance, equal to the sleeve-minimum-offset distance SMOS, in the second translational direction relative to clevis 102 toward first outer eccentric bushing 114A, with first inner eccentric bushing 124A in the second angular orientation relative to clevis 102, until at least a portion of first-inner-eccentric-bushing exterior cylindrical surface 176 is received with a slip fit within first-outer-eccentric-bushing opening 116A. The second method also comprises a step of, while maintaining first outer eccentric bushing 114A in the first angular orientation relative to clevis 102 and first inner eccentric bushing 124A in the second angular orientation relative to clevis 102, removing pin 106, in the second translational direction relative to clevis 102, from sleeve interior channel 123, from spherical bearing 140 in through opening 112 of lug 104, and from second-leg opening 110 before the step of removing sleeve 118 from first-outer-eccentric-bushing opening 116A, or removing pin 106, in the second translational direction relative to clevis 102, from first-outer-eccentric-bushing opening 116A, from spherical bearing 140 in through opening 112 of lug 104, and from second-leg opening 110 after removing sleeve 118 from first-outer-eccentric-bushing opening 116A and before biasing first inner eccentric bushing 124A in the second translational direction relative to clevis 102 until at least the portion of first-inner-eccentric-bushing exterior cylindrical surface 176 is received with the slip fit within first-outer-eccentric-bushing opening 116A, or removing pin 106, in the second translational direction relative to clevis 102, from first-inner-eccentric-bushing opening 138A, from spherical bearing 140 in through opening 112 of lug 104, and from second-leg opening 110 after removing sleeve 118 from first-outer-eccentric-bushing opening 116A and after biasing first inner eccentric bushing 124A in the second translational direction relative to clevis 102 until at least the portion of first-inner-eccentric-bushing exterior cylindrical surface 176 is received with the slip fit within first-outer-eccentric-bushing opening 116A. The second method further comprises a step of biasing second outer eccentric bushing 114B in the first translational direction relative to clevis 102, with second outer eccentric bushing 114B in a third angular orientation relative to clevis 102, wherein the third angular orientation is angularly offset from the first angular orientation by 180 degrees, until second-outer-eccentric-bushing exterior cylindrical surface 182 of second outer eccentric bushing 114B is received with a slip fit into second-leg opening 110. Second-outer-eccentric-bushing exterior cylindrical surface 182 has a diameter, identical to the outer bushing diameter OBD, and also has second-outer-eccentric-bushing-exterior-cylindrical-surface central axis 184. Second-outer-eccentric-bushing opening 116B has second-outer-eccentric-bushing-opening central axis 174 that is offset from, by the outer bearing offset distance OBOS, and is parallel to second-outer-eccentric-bushing-exterior-cylindrical-surface central axis 184. The second method also comprises a step of, while maintaining second outer eccentric bushing 114B in the third angular orientation relative to clevis 102, biasing second inner eccentric bushing 124B, which comprises second-inner-eccentric-bushing exterior cylindrical surface 188 that has a diameter, identical to the sleeve-cylindrical-outer-surface diameter SCOSD, and that also has second-inner-eccentric-bushing-exterior-cylindrical-surface central axis 190, and which second inner eccentric bushing 124B also comprises second-inner-eccentric-bushing opening 138B that is cylindrical, that has a diameter, identical to the sleeve-interior-channel diameter SICD, and that has second-inner-eccentric-bushing-opening central axis 192, which is parallel to second-inner-eccentric-bushing-exterior-cylindrical-surface central axis 190 and is offset from second-inner-eccentric-bushing-exterior-cylindrical-surface central axis 190 by a distance, equal to the sleeve-minimum-offset distance SMOS, in the first translational direction relative to clevis 102 with second inner eccentric bushing 124B in a fourth angular orientation relative to clevis 102, until at least a portion of second-inner-eccentric-bushing exterior cylindrical surface 188 is received with a slip fit within second-outer-eccentric-bushing opening 116B. Fourth angular orientation is angularly offset from the second angular orientation by 180 degrees.

The second method promotes the clocking of dual eccentric bushings of clevis 102 in an efficient manner. Clocking of the dual eccentric bushings of clevis 102 enables clevis 102 and lug 104 to be pinned together. Dual eccentric bushings and spherical bearing 140 help to accommodate pinning together clevis 102 and lug 104 when clevis 102 and lug 104 are misaligned. Abutting squaring-plate abutment surface 154 against second-leg abutment surface 166, when plate-engagement portion 125 of pin 106 is received within squaring-plate opening 152 with the slip fit, enables pin central axis 148 to be square with clevis 102. Stop surface 127 of pin 106 keeps pin 106 from passing through squaring-plate opening 152 when squaring-plate abutment surface 154 contacts stop surface 127 of pin 106. Pin cylindrical portion 119 mimics locking pin 136 that is used to pin together clevis 102 and lug 104. Biasing sleeve 118 in the second translational direction while rotating at least one of sleeve 118 or first outer eccentric bushing 114A relative to clevis 102 until pin cylindrical portion 119 is received within sleeve interior channel 123 with the slip fit, and the portion of sleeve cylindrical outer surface 121 is received with the slip fit within first-outer-eccentric-bushing opening 116A facilitates first outer eccentric bushing 114A being in a proper position and angular orientation for clocking first outer eccentric bushing 114A with first inner eccentric bushing 124A. Sleeve 118, having sleeve-cylindrical-outer-surface diameter SCOSD identical to the diameter of first-inner-eccentric-bushing exterior cylindrical surface 176, sleeve-interior-channel diameter SICD identical to the diameter of first-inner-eccentric-bushing opening 138A, and sleeve-minimum-offset distance SMOS equal to a distance between first-inner-eccentric-bushing-exterior-cylindrical-surface central axis 178 and is offset from first-inner-eccentric-bushing-exterior-cylindrical-surface central axis 178 enables sleeve 118 to replicate first inner eccentric bushing 124A and provides a proper angular orientation for first inner eccentric bushing 124A to clock with first outer eccentric bushing 114A. Biasing second outer eccentric bushing 114B in the first translational direction, with second outer eccentric bushing 114B in the third angular orientation relative to clevis 102, until second-outer-eccentric-bushing exterior cylindrical surface 182 is received with the slip fit into second-leg opening 110 facilitates second outer eccentric bushing 114B being in a proper position and angular orientation for clocking second outer eccentric bushing 114B with second inner eccentric bushing 124B. Biasing second inner eccentric bushing 124B in the first translational direction with second inner eccentric bushing 124B in the fourth angular orientation relative to clevis 102, until at least the portion of second-inner-eccentric-bushing exterior cylindrical surface 188 is received with the slip fit within second-outer-eccentric-bushing opening 116B facilitates second inner eccentric bushing 124B being in a proper position and angular orientation for clocking second inner eccentric bushing 124B with second outer eccentric bushing 114B.

Referring generally to FIGS. 1A, 1B, and 1C and particularly to, e.g., FIGS. 4-6, 8A-11, 14A, and 16-18 for illustrative purposes only and not by way of limitation, the following portion of this paragraph delineates example 24 of the subject matter, disclosed herein. According to example 24, which encompasses example 23, above, the step of rotating at least one of sleeve 118 or first outer eccentric bushing 114A relative to clevis 102 comprises rotating sleeve 118 in a first rotational direction relative to clevis 102 and rotating first outer eccentric bushing 114A in a second rotational direction relative to clevis 102. The first rotational direction is opposite the second rotational direction.

Rotating sleeve 118 and first outer eccentric bushing 114A in opposite directions relative to clevis 102 enables efficient locating of first outer eccentric bushing 114A in the first angular orientation relative to clevis 102 and efficient locating of sleeve 118 in the second angular orientation relative to clevis 102.

Referring generally to FIGS. 1A, 1B, and 1C and particularly to, e.g., FIGS. 4-6, 8A-11, 14A, and 16-18 for illustrative purposes only and not by way of limitation, the following portion of this paragraph delineates example 25 of the subject matter, disclosed herein. According to example 25, which encompasses example 23 or 24, above, the step of rotating at least one of sleeve 118 or first outer eccentric bushing 114A relative to clevis 102 comprises rotating sleeve 118 and first outer eccentric bushing 114A relative to clevis 102 at different rates.

Rotating sleeve 118 and first outer eccentric bushing 114A relative to clevis 102 in the same direction at different rates enables efficient locating of first outer eccentric bushing 114A in the first angular orientation relative to clevis 102 and efficient locating of sleeve 118 in the second angular orientation relative to clevis 102.

Referring generally to FIGS. 1A, 1B, and 1C and particularly to, e.g., FIGS. 8A-12 and 14A-24 for illustrative purposes only and not by way of limitation, the following portion of this paragraph delineates example 26 of the subject matter, disclosed herein. According to example 26, which encompasses any one of examples 23 to 25, above, the second method further uses tooling 100 of example 5 and further comprises steps of coupling first protractor 128 to first-leg abutment surface 164 of first leg 103A of clevis 102 around first-leg opening 108 of first leg 103A of clevis 102 and coupling second protractor 129 to second-leg abutment surface 166 of second leg 103B of clevis 102 around second-leg opening 110 of second leg 103B of clevis 102.

Coupling first protractor 128 to first-leg abutment surface 164 around first-leg opening 108 provides a guide for orienting first inner eccentric bushing 124A in the second angular orientation relative to clevis 102 when first inner eccentric bushing 124A is biased in the second translational direction. Coupling second protractor 129 to second-leg abutment surface 166 around second-leg opening 110 provides a guide for orienting second outer eccentric bushing 114B in the third orientation when second outer eccentric bushing 114B is biased in the first translational direction and second inner eccentric bushing 124B in the fourth angular orientation relative to clevis 102 when second inner eccentric bushing 124B is biased in the first translational direction.

Referring generally to FIGS. 1A, 1B, and 1C and particularly to, e.g., FIGS. 14A and 14B for illustrative purposes only and not by way of limitation, the following portion of this paragraph delineates example 27 of the subject matter, disclosed herein. According to example 27, which encompasses example 26, above, the second method further uses tooling 100 of example 9 and further comprises a step of applying first-inner-eccentric-bushing mark 193 onto first protractor 128 at a location that is angularly aligned with angular-orientation indicator mark 134 of sleeve 118, relative to first-leg-opening central axis 144, when sleeve 118 is in the second angular orientation relative to clevis 102 and when the portion of sleeve cylindrical outer surface 121 is received with the slip fit within first-outer-eccentric-bushing opening 116A. The step of biasing first inner eccentric bushing 124A in the second translational direction relative to clevis 102, with first inner eccentric bushing 124A in the second angular orientation relative to clevis 102, comprises angularly aligning, relative to first-leg-opening central axis 144, first-inner-eccentric-bushing indicium 132A with first-inner-eccentric-bushing mark 193 on first protractor 128.

First-inner-eccentric-bushing mark 193 provides a clear visual indication, witness, and reminder of the second angular orientation relative to clevis 102, which promotes reliably locating first inner eccentric bushing 124A in the second angular orientation.

Referring generally to FIGS. 1A, 1B, and 1C and particularly to, e.g., FIGS. 15A and 15B for illustrative purposes only and not by way of limitation, the following portion of this paragraph delineates example 28 of the subject matter, disclosed herein. According to example 28, which encompasses example 27, above, the second method further comprises a step of applying second-inner-eccentric-bushing mark 195 onto second protractor 129 at a location that is angularly offset from first-inner-eccentric-bushing mark 193 by 180 degrees. The step of biasing second inner eccentric bushing 124B in the first translational direction relative to clevis 102, with second inner eccentric bushing 124B in the fourth angular orientation relative to clevis 102, comprises angularly aligning, relative to second-leg-opening central axis 146, second-inner-eccentric-bushing indicium 132B with second-inner-eccentric-bushing mark 195 on second protractor 129.

Second-inner-eccentric-bushing mark 195 provides a clear visual indication, witness, and reminder of the fourth angular orientation relative to clevis 102, which promotes reliably locating second inner eccentric bushing 124B in the fourth angular orientation.

Referring generally to FIGS. 1A, 1B, and 1C and particularly to, e.g., FIGS. 14A and 15A for illustrative purposes only and not by way of limitation, the following portion of this paragraph delineates example 29 of the subject matter, disclosed herein. According to example 29, which encompasses example 28, above, the second method further comprises a step of applying first-outer-eccentric-bushing mark 197 onto first protractor 128 at a location that is angularly aligned with first-outer-eccentric-bushing indicium 126A of first outer eccentric bushing 114A, relative to first-leg-opening central axis 144, when first outer eccentric bushing 114A is in the first angular orientation relative to clevis 102 and when first-outer-eccentric-bushing exterior cylindrical surface 170 is received with the slip fit into first-leg opening 108. The second method also comprises steps of applying second-outer-eccentric-bushing mark 199 onto second protractor 129 at a location that is angularly offset from first-outer-eccentric-bushing mark 197 by 180 degrees, and biasing second outer eccentric bushing 114B in the first translational direction relative to clevis 102, with second outer eccentric bushing 114B in the third angular orientation relative to clevis 102. The step of biasing second outer eccentric bushing 114B in the first translational direction relative to clevis 102, with second outer eccentric bushing 114B in the third angular orientation relative to clevis 102, comprises radially aligning, relative to second-leg-opening central axis 146, second-outer-eccentric-bushing indicium 126B of second outer eccentric bushing 114B with second-outer-eccentric-bushing mark 199 on second protractor 129.

First-outer-eccentric-bushing mark 197 provides a clear visual indication, witness, and reminder of the first angular orientation relative to clevis 102, which promotes reliably applying second-outer-eccentric-bushing mark 199 onto second protractor 129 at the location that is angularly offset from first-outer-eccentric-bushing mark 197 by 180 degrees. Second-outer-eccentric-bushing mark 199 provides a clear visual indication, witness, and reminder of the third angular orientation relative to clevis 102, which promotes reliably locating second outer eccentric bushing 114B in the third angular orientation.

In some examples, tooling 100 forms part of coupling system 101, which, in addition to tooling 100, also includes first outer eccentric bushing 114A, second outer eccentric bushing 114B, first inner eccentric bushing 124A, second inner eccentric bushing 124B, and locking pin 136. Referring to FIGS. 2, 3, 25, 26, and 28, after first outer eccentric bushing 114A, second outer eccentric bushing 114B, first inner eccentric bushing 124A, second inner eccentric bushing 124B are clocked using tooling 100, in some examples, locking pin 136 is passed through first-inner-eccentric-bushing opening 138A, spherical bearing 140 of lug 104, and second-inner-eccentric-bushing opening 138B to pin together clevis 102 and lug 104. Locking pin 136 can be secured in place with one or more locking elements, such as nuts, washers, pins, and the like.

Furthermore, in some examples, coupling system 101 includes keepers that help prevent rotation of first outer eccentric bushing 114A, second outer eccentric bushing 114B, first inner eccentric bushing 124A, and second inner eccentric bushing 124B after first outer eccentric bushing 114A, second outer eccentric bushing 114B, first inner eccentric bushing 124A, and second inner eccentric bushing 124B have been clocked via tooling 100 and, for example, before locking pin 136 has been inserted. Accordingly, in certain examples, the keepers ensure first outer eccentric bushing 114A, second outer eccentric bushing 114B, first inner eccentric bushing 124A, and second inner eccentric bushing 124B remain clocked while locking pin 136 is inserted and secured in place. In some specific examples, and referring to FIGS. 2, 3, 26, and 28, the keepers include first-outer-eccentric-bushing keeper 151A, configured to engage and prevent rotation, relative to clevis 102, of first outer eccentric bushing 114A, first-inner-eccentric-bushing keeper 153A, configured to engage and prevent rotation, relative to clevis 102, of first inner eccentric bushing 124A, second-outer-eccentric-bushing keeper 151B, configured to engage and prevent rotation, relative to clevis 102, of second outer eccentric bushing 114B, second-inner-eccentric-bushing keeper 153B, configured to engage and prevent rotation, relative to clevis 102, of second inner eccentric bushing 124B. According to some examples, the keepers are co-rotatably engaged with the corresponding one of the eccentric bushings and fixed to clevis 102 (e.g., via fasteners) such that the keepers do not rotate relative to clevis 102.

Figure 30:
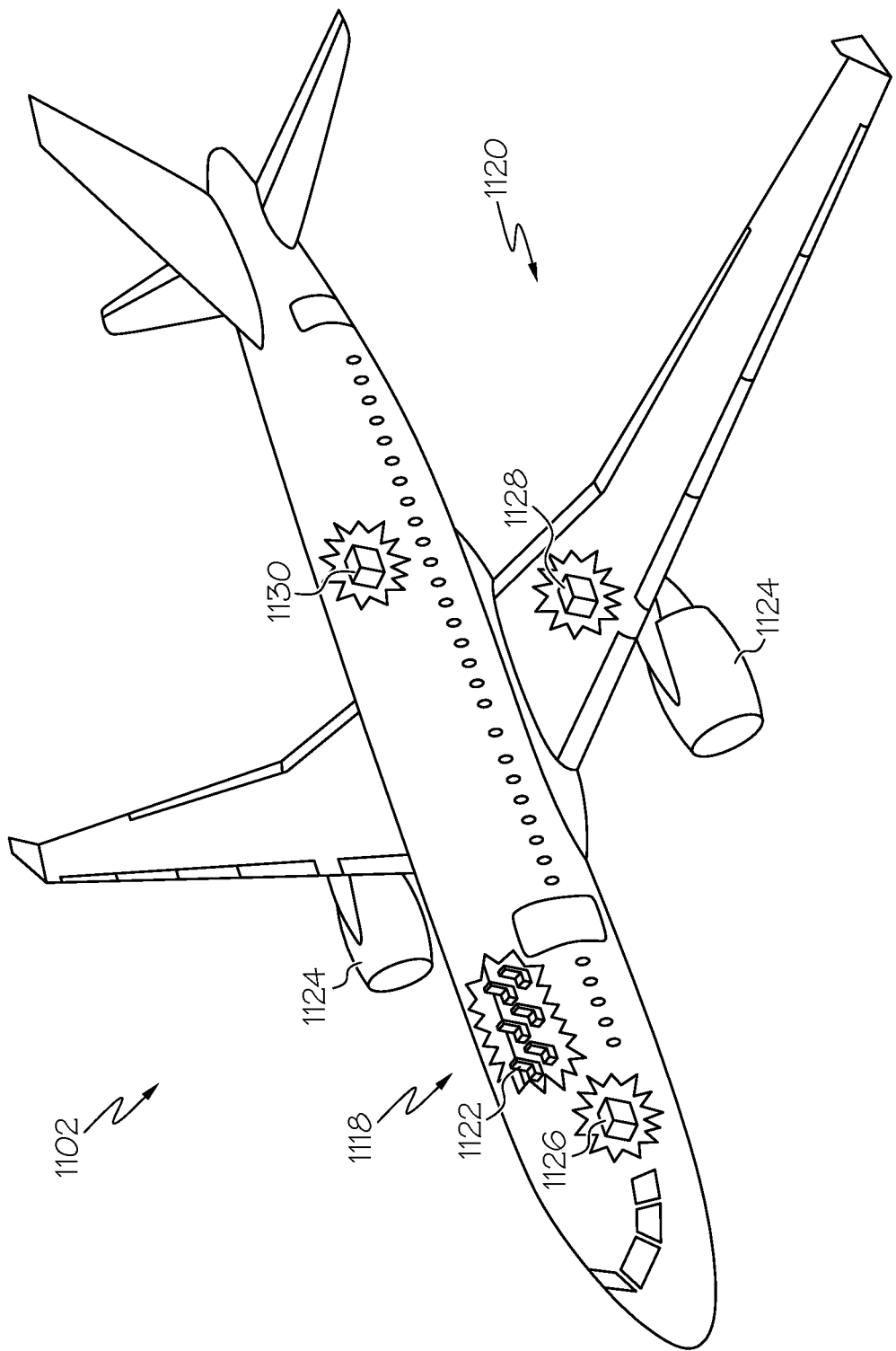
FIG. 30 is a schematic illustration of an aircraft.

Examples of the subject matter, disclosed herein may be described in the context of aircraft manufacturing and service method 1100 as shown in FIG. 29 and aircraft 1102 as shown in FIG. 30. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 30, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. Tooling for clocking dual eccentric bushings of a clevis so that the clevis and a lug can be pinned together, the tooling comprising:
 a pin, comprising a pin central axis, a pin cylindrical portion, a plate-engagement portion, extending along the pin central axis from the pin cylindrical portion, and a stop surface, located between the pin cylindrical portion and the plate-engagement portion and extending perpendicular to the pin central axis;
 a sleeve, comprising:
  a sleeve cylindrical outer surface that has a sleeve-cylindrical-outer-surface diameter (SCOSD) and a sleeve-cylindrical-outer-surface central axis, and
  a sleeve interior channel that is cylindrical, that has a sleeve-interior-channel diameter (SICD), and that has an interior-channel central axis, which is parallel to the sleeve-cylindrical-outer-surface central axis and is offset from the sleeve-cylindrical-outer-surface central axis by a sleeve-minimum-offset distance (SMOS), wherein the pin cylindrical portion is configured to be received by the sleeve interior channel with a slip fit; and a squaring plate, comprising:
  a squaring-plate abutment surface, configured to contact the stop surface of the pin; and
  a squaring-plate opening, extending through the squaring-plate abutment surface and configured to receive the plate-engagement portion of the pin with a slip fit.

2. The tooling according to claim 1, wherein:
the pin further comprises a pin tapered end portion, extending along the pin central axis from the pin cylindrical portion away from the plate-engagement portion; and
the pin tapered end portion and the plate-engagement portion of the pin extend from the pin cylindrical portion in opposite directions.

3. The tooling according to claim 1, wherein the sleeve further comprises a sleeve tapered outer surface, extending along the sleeve-cylindrical-outer-surface central axis from the sleeve cylindrical outer surface.

4. The tooling according to claim 1, wherein the sleeve further comprises:
  a sleeve-end outer surface, extending perpendicular to the sleeve-cylindrical-outer-surface central axis; and
  an angular-orientation indicator mark, located on at least one of the sleeve cylindrical outer surface or the sleeve-end outer surface.

5. The tooling according to claim 4, further comprising:
a first protractor; and
a second protractor;
wherein each one of the first protractor and the second protractor is configured to identify an angular orientation of the angular-orientation indicator mark of the sleeve.

6. The tooling according to claim 5, wherein:
the first protractor has a maximum thickness, and the second protractor has the maximum thickness;
the squaring plate further comprises a groove, formed in the squaring-plate abutment surface;
the groove is shaped to receive either one of the first protractor or the second protractor; and
the groove has a depth that is greater than the maximum thickness of the first protractor and of the second protractor.

7. The tooling according to claim 5, wherein each one of the first protractor and the second protractor is an adhesive sticker.

8. The tooling according to claim 7, wherein:
the first protractor comprises a first-protractor alignment tab that defines a first-protractor-clevis-alignment edge; and
the second protractor comprises a second-protractor alignment tab that defines a second-protractor-clevis-alignment edge.

9. The tooling according to claim 8, wherein:
the first protractor further comprises a first-protractor score line between the squaring-plate opening and the first-protractor alignment tab; and
the second protractor further comprises a second-protractor score line between the squaring-plate opening and the second-protractor alignment tab.

10. The tooling according to claim 1, wherein:
the squaring plate further comprises a notch that is offset from the squaring-plate opening in a direction, perpendicular to a central axis of the squaring-plate opening; and
the notch of the squaring plate is closed in directions, perpendicular to the radius of the squaring-plate opening, and along a plane, perpendicular to the central axis of the squaring-plate opening.

11. The tooling according to claim 1, further comprising a puller that is configured to threadably engage the sleeve.

12. The tooling according to claim 1, wherein the sleeve further comprises an annular flange, extending circumferentially about and protruding radially outwardly from the sleeve cylindrical outer surface.

13. The tooling according to claim 12, further comprising a forked tool, comprising prongs, wherein the prongs are spaced-apart so that the sleeve cylindrical outer surface fits between the prongs, and the annular flange has a diameter, which is greater than a distance between the prongs.

14. The tooling according to claim 1, wherein:
the sleeve further comprises holes, extending from the sleeve cylindrical outer surface to the sleeve interior channel;
the holes are on opposite sides of the sleeve from each other; and
the tooling further comprises a rod, configured to extend through the holes in a direction perpendicular to the sleeve-cylindrical-outer-surface central axis.

15. A method of using the tooling of claim 1 for clocking the dual eccentric bushings of the clevis so that the clevis and the lug, which comprises a through opening and a spherical bearing, located in the through opening, can be pinned together, the method comprising steps of:
  with the lug positioned between a first leg and a second leg of the clevis such that the pin cylindrical portion is capable of simultaneously extending through a first-leg opening in the first leg of the clevis, through the spherical bearing in the through opening of the lug, and through a second-leg opening of the second leg of the clevis, inserting the pin, in a first translational direction relative to the clevis, through the second-leg opening, through the spherical bearing in the through opening of the lug, and through the first-leg opening, wherein the spherical bearing is configured to receive the pin cylindrical portion with a slip fit;
  with the plate-engagement portion of the pin received within the squaring-plate opening with a slip fit, and with a portion of the squaring-plate abutment surface contacting the stop surface of the pin, abutting the squaring-plate abutment surface against a second-leg abutment surface of the second leg of the clevis so that the pin central axis is parallel to or collinear with a first-leg-opening central axis of the first-leg opening and is parallel to or collinear with a second-leg-opening central axis of the second-leg opening, and so that the pin cylindrical portion extends through the second-leg opening, through the spherical bearing in the through opening of the lug, and through the first-leg opening;
  biasing a first outer eccentric bushing in a second translational direction relative to the clevis, opposite the first translational direction, until the pin cylindrical portion is received into a first-outer-eccentric-bushing opening of the first outer eccentric bushing and a first-outer-eccentric-bushing exterior cylindrical surface of the first outer eccentric bushing is received with a slip fit into the first-leg opening, wherein the first-outer-eccentric-bushing exterior cylindrical surface has a first-outer-eccentric-bushing-exterior-cylindrical-surface central axis, the first-outer-eccentric-bushing opening has a first-outer-eccentric-bushing-opening central axis that is offset from and is parallel to the first-outer-eccentric-bushing-exterior-cylindrical-surface central axis, and the sleeve cylindrical outer surface is configured to be received within the first-outer-eccentric-bushing opening with a slip fit;

with the pin cylindrical portion extending through the first-outer-eccentric-bushing opening, biasing the sleeve in the second translational direction relative to the clevis while rotating at least one of the sleeve or the first outer eccentric bushing relative to the clevis until the pin cylindrical portion is received within the sleeve interior channel with the slip fit, a portion of the sleeve cylindrical outer surface is received with a slip fit within the first-outer-eccentric-bushing opening, the first outer eccentric bushing is in a first angular orientation relative to the clevis, and the sleeve is in a second angular orientation relative to the clevis;

removing the sleeve from the first-outer-eccentric-bushing opening in the second translational direction relative to the clevis, while maintaining the first outer eccentric bushing in the first angular orientation relative to the clevis;

while maintaining the first outer eccentric bushing in the first angular orientation relative to the clevis, biasing a first inner eccentric bushing, which comprises a first-inner-eccentric-bushing exterior cylindrical surface that has a diameter, identical to the sleeve-cylindrical-outer-surface diameter (SCOSD), and that also has a first-inner-eccentric-bushing-exterior-cylindrical-surface central axis, and a first-inner-eccentric-bushing opening that is cylindrical, that has a diameter, identical to the sleeve-interior-channel diameter (SICD), and that has a first-inner-eccentric-bushing-opening central axis, which is parallel to the first-inner-eccentric-bushing-exterior-cylindrical-surface central axis and is offset from the first-inner-eccentric-bushing-exterior-cylindrical-surface central axis by a distance, equal to the sleeve-minimum-offset distance (SMOS), in the second translational direction relative to the clevis, with the first inner eccentric bushing in the second angular orientation relative to the clevis, until at least a portion of the first-inner-eccentric-bushing exterior cylindrical surface is received with a slip fit within the first-outer-eccentric-bushing opening;

while maintaining the first outer eccentric bushing in the first angular orientation relative to the clevis and the first inner eccentric bushing in the second angular orientation relative to the clevis, removing the pin, in the second translational direction relative to the clevis, from the sleeve interior channel, from the spherical bearing in the through opening of the lug, and from the second-leg opening before the step of removing the sleeve from the first-outer-eccentric-bushing opening; or removing the pin, in the second translational direction relative to the clevis, from the first-outer-eccentric-bushing opening, from the spherical bearing in the through opening of the lug, and from the second-leg opening after the step of removing the sleeve from the first-outer-eccentric-bushing opening and before biasing the first inner eccentric bushing in the second translational direction relative to the clevis until at least the portion of the first-inner-eccentric-bushing exterior cylindrical surface is received with the slip fit within the first-outer-eccentric-bushing opening; or removing the pin, in the second translational direction relative to the clevis, from the first-inner-eccentric-bushing opening, from the spherical bearing in the through opening of the lug, and from the second-leg opening after the step of removing the sleeve from the first-outer-eccentric-bushing opening and after biasing the first inner eccentric bushing, in the second translational direction relative to the clevis, until at least the portion of the first-inner-eccentric-bushing exterior cylindrical surface is received with the slip fit within the first-outer-eccentric-bushing opening;

with the first outer eccentric bushing in the first angular orientation relative to the clevis and the first inner eccentric bushing in the second angular orientation relative to the clevis, inserting the pin, in the second translational direction relative to the clevis, through the first-inner-eccentric-bushing opening with the slip fit, through the spherical bearing in the through opening of the lug with the slip fit, and through the second-leg opening;

biasing a second outer eccentric bushing in the first translational direction relative to the clevis until the pin cylindrical portion is received into a second-outer-eccentric-bushing opening of the second outer eccentric bushing, and a second-outer-eccentric-bushing exterior cylindrical surface of the second outer eccentric bushing is received with a slip fit within the second-leg opening, wherein the second-outer-eccentric-bushing exterior cylindrical surface comprises a second-outer-eccentric-bushing-exterior-cylindrical-surface central axis, and the second-outer-eccentric-bushing opening has a second-outer-eccentric-bushing-opening central axis that is offset from and is parallel to the second-outer-eccentric-bushing-exterior-cylindrical-surface central axis, and the sleeve cylindrical outer surface is configured to be received within the second-outer-eccentric-bushing opening with a slip fit;

with the pin cylindrical portion extending through the second-outer-eccentric-bushing opening, biasing the sleeve in the first translational direction relative to the clevis while rotating at least one of the sleeve or the second outer eccentric bushing relative to the clevis until the pin cylindrical portion is received within the sleeve interior channel with the slip fit, a portion of the sleeve cylindrical outer surface is received with a slip fit within the second-outer-eccentric-bushing opening, the second outer eccentric bushing is in a third angular orientation relative to the clevis, and the sleeve is in a fourth angular orientation relative to the clevis;

removing the sleeve from the second-outer-eccentric-bushing opening in the second translational direction relative to the clevis, while maintaining the second outer eccentric bushing in the third angular orientation relative to the clevis;

while maintaining the second outer eccentric bushing in the third angular orientation relative to the clevis, biasing a second inner eccentric bushing, which comprises a second-inner-eccentric-bushing exterior cylindrical surface that has a diameter, identical to the sleeve-cylindrical-outer-surface diameter (SCOSD), and that also has a second-inner-eccentric-bushing-exterior-cylindrical-surface central axis, and a second-inner-eccentric-bushing opening that is cylindrical, that has a diameter, identical to the sleeve-interior-channel diameter (SICD), and that has a second-inner-eccentric-bushing-opening central axis, which is parallel to the second-inner-eccentric-bushing-exterior-cylindrical-surface central axis and is offset from the second-inner-eccentric-bushing-exterior-cylindrical-surface central axis by a distance, equal to the sleeve-minimum-offset distance (SMOS), in the first translational direction relative to the clevis, with the second inner eccentric bushing in the fourth angular orientation relative to the clevis, until at least a portion of the second-inner-eccentric-bushing exterior cylindrical surface of the second inner eccentric bushing is received with a slip fit within the second-outer-eccentric-bushing opening; and while maintaining the first outer eccentric bushing in the first angular orientation relative to the clevis, the first inner eccentric bushing in the second angular orientation relative to the clevis, the second outer eccentric bushing in the third angular orientation relative to the clevis, and the second inner eccentric bushing in the fourth angular orientation relative to the clevis, removing the pin, in the first translational direction relative to the clevis, from the sleeve interior channel, from the spherical bearing in the through opening of the lug, and from the first-inner-eccentric-bushing opening before removing the sleeve from the second-outer-eccentric-bushing opening; or removing the pin, in the first translational direction relative to the clevis, from the second-outer-eccentric-bushing opening, from the spherical bearing in the through opening of the lug, and from the first-inner-eccentric-bushing opening after the step of removing the sleeve from the second-outer-eccentric-bushing opening and before the step of biasing the second inner eccentric bushing in the first translational direction relative to the clevis until at least the portion of the second-inner-eccentric-bushing exterior cylindrical surface is received with the slip fit within the second-outer-eccentric-bushing opening; or removing the pin, in the first translational direction relative to the clevis, from the second-inner-eccentric-bushing opening, from the spherical bearing in the through opening of the lug, and from the first-inner-eccentric-bushing opening after the step of removing the sleeve from the second-outer-eccentric-bushing opening and after the step of biasing the second inner eccentric bushing in the first translational direction relative to the clevis until at least the portion of the second-inner-eccentric-bushing exterior cylindrical surface is received with the slip fit within the second-outer-eccentric-bushing opening.

16. The method according to claim 15, wherein:

the step of rotating at least one of the sleeve or the first outer eccentric bushing relative to the clevis comprises a step of rotating the sleeve in a first rotational direction relative to the clevis and a step of rotating the first outer eccentric bushing in a second rotational direction relative to the clevis; and the first rotational direction is opposite the second rotational direction.

17. The method according to claim 15, wherein the step of rotating at least one of the sleeve or the first outer eccentric bushing relative to the clevis comprises rotating the sleeve and first outer eccentric bushing relative to the clevis at different rates.

18. The method according to claim 15, wherein:

the step of rotating at least one of the sleeve or the second outer eccentric bushing relative to the clevis comprises rotating the sleeve in a first rotational direction relative to the clevis and rotating the second outer eccentric bushing in a second rotational direction relative to the clevis; and the first rotational direction is opposite the second rotational direction.

19. A method of using the tooling of claim 1 for clocking the dual eccentric bushings of the clevis so that the clevis and the lug, which comprises a through opening and a spherical bearing, located in the through opening, can be pinned together, the method comprising steps of:

with the lug positioned between a first leg and a second leg of the clevis such that the pin cylindrical portion is capable of simultaneously extending through a first-leg opening in the first leg of the clevis, through the spherical bearing in the through opening of the lug, and through a second-leg opening of the second leg of the clevis, inserting the pin, in a first translational direction relative to the clevis, through the second-leg opening, through the spherical bearing in the through opening of the lug, and through the first-leg opening, wherein the spherical bearing is configured to receive the pin cylindrical portion with a slip fit;

with the plate-engagement portion of the pin received within the squaring-plate opening with a slip fit, and with a portion of the squaring-plate abutment surface contacting the stop surface of the pin, abutting the squaring-plate abutment surface against a second-leg abutment surface of the second leg of the clevis so that the pin central axis is parallel to or collinear with a first-leg-opening central axis of the first-leg opening and is parallel to or collinear with a second-leg-opening central axis of the second-leg opening, and so that the pin cylindrical portion extends through the second-leg opening, through the spherical bearing in the through opening of the lug, and through the first-leg opening;

biasing a first outer eccentric bushing in a second translational direction relative to the clevis, opposite the first translational direction, until the pin cylindrical portion is received into a first-outer-eccentric-bushing opening of the first outer eccentric bushing, and a first-outer-eccentric-bushing exterior cylindrical surface of the first outer eccentric bushing is received with a slip fit into the first-leg opening, wherein the first-outer-eccentric-bushing exterior cylindrical surface has an outer bushing diameter (OBD) and a first-outer-eccentric-bushing-exterior-cylindrical-surface central axis, the first-outer-eccentric-bushing opening has a first-outer-eccentric-bushing-opening central axis that is offset from, by an outer bearing offset distance (OBOS), and is parallel to the first-outer-eccentric-bushing-exterior-cylindrical-surface central axis, and the sleeve cylindrical outer surface is configured to be received within the first-outer-eccentric-bushing opening with a slip fit;

with the pin cylindrical portion extending through the first-outer-eccentric-bushing opening, biasing the sleeve in the second translational direction relative to the clevis while rotating at least one of the sleeve or the first outer eccentric bushing relative to the clevis until the pin cylindrical portion is received within the sleeve interior channel with the slip fit, a portion of the sleeve cylindrical outer surface is received with a slip fit within the first-outer-eccentric-bushing opening, the first outer eccentric bushing is in a first angular orientation relative to the clevis, and the sleeve is in a second angular orientation relative to the clevis;

removing the sleeve, in the second translational direction relative to the clevis, from the first-outer-eccentric-bushing opening while maintaining the first outer eccentric bushing in the first angular orientation relative to the clevis;

while maintaining the first outer eccentric bushing in the first angular orientation relative to the clevis, biasing a first inner eccentric bushing, which comprises:

a first-inner-eccentric-bushing exterior cylindrical surface that has a diameter, identical to the sleeve-cylindrical-outer-surface diameter (SCOSD), and that also has a first-inner-eccentric-bushing-exterior-cylindrical-surface central axis, and a first-inner-eccentric-bushing opening that is cylindrical, that has a diameter, identical to the sleeve-interior-channel diameter (SICD), and that has a first-inner-eccentric-bushing-opening central axis, which is parallel to the first-inner-eccentric-bushing-exterior-cylindrical-surface central axis and is offset from the first-inner-eccentric-bushing-exterior-cylindrical-surface central axis by a distance, equal to the sleeve-minimum-offset distance, in the second translational direction relative to the clevis toward the first outer eccentric bushing, with the first inner eccentric bushing in the second angular orientation relative to the clevis, until at least a portion of the first-inner-eccentric-bushing exterior cylindrical surface is received with a slip fit within the first-outer-eccentric-bushing opening;

while maintaining the first outer eccentric bushing in the first angular orientation relative to the clevis and the first inner eccentric bushing in the second angular orientation relative to the clevis, removing the pin, in the second translational direction relative to the clevis, from the sleeve interior channel, from the spherical bearing in the through opening of the lug, and from the second-leg opening before the step of removing the sleeve from the first-outer-eccentric-bushing opening; or removing the pin, in the second translational direction relative to the clevis, from the first-outer-eccentric-bushing opening, from the spherical bearing in the through opening of the lug, and from the second-leg opening after removing the sleeve from the first-outer-eccentric-bushing opening and before biasing the first inner eccentric bushing in the second translational direction relative to the clevis until at least the portion of the first-inner-eccentric-bushing exterior cylindrical surface is received with the slip fit within the first-outer-eccentric-bushing opening; or removing the pin, in the second translational direction relative to the clevis, from the first-inner-eccentric-bushing opening, from the spherical bearing in the through opening of the lug, and from the second-leg opening after removing the sleeve from the first-outer-eccentric-bushing opening and after biasing the first inner eccentric bushing in the second translational direction relative to the clevis until at least the portion of the first-inner-eccentric-bushing exterior cylindrical surface is received with the slip fit within the first-outer-eccentric-bushing opening;

biasing the second outer eccentric bushing in the first translational direction relative to the clevis, with the second outer eccentric bushing in a third angular orientation relative to the clevis, wherein the third angular orientation is angularly offset from the first angular orientation by 180 degrees, until a second-outer-eccentric-bushing exterior cylindrical surface of the second outer eccentric bushing is received with a slip fit into the second-leg opening, wherein the second-outer-eccentric-bushing exterior cylindrical surface has a diameter, identical to the outer bushing diameter (OBD), and also has a second-outer-eccentric-bushing-exterior-cylindrical-surface central axis, and wherein the second-outer-eccentric-bushing opening has a second-outer-eccentric-bushing-opening central axis that is offset from, by the outer bearing offset distance (OBOS), and is parallel to the second-outer-eccentric-bushing-exterior-cylindrical-surface central axis; and while maintaining the second outer eccentric bushing in the third angular orientation relative to the clevis, biasing the second inner eccentric bushing, which comprises a second-inner-eccentric-bushing exterior cylindrical surface that has a diameter, identical to the sleeve-cylindrical-outer-surface diameter (SCOSD), and that also has a second-inner-eccentric-bushing-exterior-cylindrical-surface central axis, and a second-inner-eccentric-bushing opening that is cylindrical, that has a diameter, identical to the sleeve-interior-channel diameter (SICD), and that has a second-inner-eccentric-bushing-opening central axis, which is parallel to the second-inner-eccentric-bushing-exterior-cylindrical-surface central axis and is offset from the second-inner-eccentric-bushing-exterior-cylindrical-surface central axis by a distance, equal to the sleeve-minimum-offset distance (SMOS), in the first translational direction relative to the clevis with the second inner eccentric bushing in a fourth angular orientation relative to the clevis, until at least a portion of the second-inner-eccentric-bushing exterior cylindrical surface is received with a slip fit within the second-outer-eccentric-bushing opening, wherein the fourth angular orientation is angularly offset from the second angular orientation by 180 degrees.

20. The method according to claim 19, wherein:

the step of rotating at least one of the sleeve or the first outer eccentric bushing relative to the clevis comprises rotating the sleeve in a first rotational direction relative to the clevis and rotating the first outer eccentric bushing in a second rotational direction relative to the clevis; and the first rotational direction is opposite the second rotational direction.

* * * * *

UNITED STATES PATENT AND TRADEMARK OFFICE
CERTIFICATE OF CORRECTION

PATENT NO. : 11,608,855 B2
APPLICATION NO. : 17/513465
DATED : March 21, 2023
INVENTOR(S) : T. Harleman It is certified that error appears in the above-identified patent and that said Letters Patent is hereby corrected as shown below:

In the Claims

Column 37, Line 22:
 "the sleeve-minimum-offset distance,
in the second translational direction"
Should read:
"the sleeve-minimum-offset distance (SMOS), in the second translational direction"

Column 38, Line 39-40:
 "(SMOS),
in the first translational direction"
Should read:
"(SMOS), in the first translational direction"

Signed and Sealed this
Ninth Day of May, 2023

Katherine Kelly Vidal
*Director of the United States Patent and Trademark Office*